US012256860B2

United States Patent
Udagawa et al.

(10) Patent No.: US 12,256,860 B2
(45) Date of Patent: Mar. 25, 2025

(54) SCREEN ATTACHMENT APPARATUS, KIT FOR QUICK DEPLOYMENT OF A SCREEN APPARATUS THAT CAN PROVIDE BIOHAZARD PROTECTION AND/OR PRIVACY AND METHOD OF POSITIONING A PRIVACY SCREEN ADJACENT A WORK SURFACE

(71) Applicant: Knoll, Inc., East Greenville, PA (US)

(72) Inventors: Masamichi Udagawa, New York, NY (US); Sigrid Moeslinger, New York, NY (US); Jeffrey P. Lee, East Greenville, PA (US)

(73) Assignee: KNOLL, INC., East Greenville, PA (US)

( * ) Notice: Subject to any disclaimer, the term of this patent is extended or adjusted under 35 U.S.C. 154(b) by 940 days.

(21) Appl. No.: 17/240,392

(22) Filed: Apr. 26, 2021

(65) Prior Publication Data
US 2021/0330098 A1    Oct. 28, 2021

Related U.S. Application Data

(60) Provisional application No. 63/016,090, filed on Apr. 27, 2020.

(51) Int. Cl.
*A47G 5/00* (2006.01)
*A47B 83/00* (2006.01)
(Continued)

(52) U.S. Cl.
CPC .............. *A47G 5/00* (2013.01); *A47B 83/001* (2013.01); *A47B 96/20* (2013.01);
(Continued)

(58) Field of Classification Search
CPC ........ A47G 5/00; A47B 83/001; A47B 96/20; A47B 2200/0085; A47B 2200/12; E04B 2/74; E04B 2002/7483
(Continued)

(56) References Cited

U.S. PATENT DOCUMENTS 1,952,749 A * 3/1934 Ellis .................... A47B 13/06
312/229
2,168,911 A * 8/1939 Meyer ................... A47F 5/005
403/205
(Continued)

FOREIGN PATENT DOCUMENTS

EP     3311697 A1 *  4/2018  ............. A47B 97/00
GB     2537667 A   * 10/2016  ............. A47B 97/00
(Continued)

OTHER PUBLICATIONS

International Search Report for PCT/US2021/029379 dated Sep. 28, 2021.
(Continued)

*Primary Examiner* — Janet M Wilkens
(74) *Attorney, Agent, or Firm* — Buchanan Ingersoll & Rooney PC

(57) ABSTRACT

A privacy screen attachment apparatus can include a connection mechanism configured for attachment or releasable attachment to a bottom of a work surface and/or a perimeter edge of the work surface for retaining a privacy screen body at the perimeter edge of the work surface so the body extends above the work surface. In some embodiments, the screen body can include the connection mechanism such that a portion of the screen body is foldable for attachment to the bottom of the work surface while a lower portion above the foldable portion is attachable to the perimeter edge of the work surface. In other embodiments, the connection mechanism can be a separate element that is positioned to retain or
(Continued)

otherwise position a lower edge portion of the privacy screen body adjacent the perimeter edge of the work surface and/or in contact with the perimeter edge of the work surface.

8 Claims, 22 Drawing Sheets

(51) Int. Cl.
 *A47B 96/20* (2006.01)
 *E04B 2/74* (2006.01)
(52) U.S. Cl.
 CPC ... *A47B 2200/0085* (2013.01); *A47B 2200/12* (2013.01); *E04B 2/74* (2013.01); *E04B 2002/7483* (2013.01)
(58) Field of Classification Search
 USPC .......................... 108/60, 61; 312/223.3, 196
 See application file for complete search history.

(56) References Cited

U.S. PATENT DOCUMENTS

| | | | |
|---|---|---|---|
| 2,821,450 A | | 1/1958 | Knoll |
| 3,998,509 A * | | 12/1976 | Hauser .................. A47F 3/12 |
| | | | D6/661 |
| 4,248,325 A | | 2/1981 | Georgopoulos |
| 4,325,597 A | | 4/1982 | Morrison |
| 4,759,520 A | | 7/1988 | Levine |
| 5,287,909 A | | 2/1994 | King et al. |
| 5,675,946 A | | 10/1997 | Verbeek et al. |
| 5,680,893 A | | 10/1997 | Neer |
| 5,853,239 A * | | 12/1998 | Laib .................. A47B 88/994 |
| | | | 312/348.3 |
| 5,890,782 A * | | 4/1999 | Alberts ............... A47B 17/00 |
| | | | 312/258 |
| 5,966,879 A | | 10/1999 | Verbeek et al. |
| 6,000,180 A | | 12/1999 | Goodman et al. |
| 6,002,613 A | | 12/1999 | Cloud et al. |
| D427,783 S | | 7/2000 | Luedke |
| 6,293,328 B1 | | 9/2001 | Fremont |
| 6,367,213 B1 | | 4/2002 | Reuter et al. |
| D457,359 S | | 5/2002 | Chan |
| D458,040 S | | 6/2002 | Stannis et al. |
| 6,769,747 B2 | | 8/2004 | Chan et al. |
| 6,896,028 B2 | | 5/2005 | Brennan |
| 7,140,499 B2 * | | 11/2006 | Burke .................. A47F 1/126 |
| | | | 211/59.3 |
| 7,310,918 B1 | | 12/2007 | Reuter et al. |
| 7,789,025 B2 | | 9/2010 | Michaud, II et al. |
| D653,862 S | | 2/2012 | Hairston |
| 8,365,798 B2 | | 2/2013 | Feldpausch et al. |
| 9,163,393 B2 | | 10/2015 | Carroll |
| D796,216 S | | 9/2017 | Rockwell et al. |
| D800,459 S | | 10/2017 | Rockwell et al. |
| 9,920,520 B2 | | 3/2018 | Udagawa et al. |
| 2006/0172114 A1 | | 8/2006 | Hancock |
| 2007/0033898 A1 | | 2/2007 | Sutton |
| 2008/0283032 A1 * | | 11/2008 | Dang .................. F24C 15/36 |
| | | | 126/42 |
| 2012/0304441 A1 | | 12/2012 | Henriott |
| 2016/0213145 A1 | | 7/2016 | Johnson et al. |
| 2016/0360882 A1 | | 12/2016 | Edwards |
| 2017/0226749 A1 | | 8/2017 | Fjetland |
| 2018/0245334 A1 | | 8/2018 | Udagawa et al. |
| 2019/0242182 A1 | | 8/2019 | Newhouse et al. |
| 2020/0352332 A1 * | | 11/2020 | Gass .................. A47B 97/00 |
| 2020/0383501 A1 | | 12/2020 | Udagawa et al. |

FOREIGN PATENT DOCUMENTS

| | | |
|---|---|---|
| KR | 20090002623 A | 1/2009 |
| KR | 200459060 Y1 | 3/2012 |

OTHER PUBLICATIONS

Written Opinion of the International Search Authority for PCT/US2021/029379 dated Sep. 28, 2021.

* cited by examiner

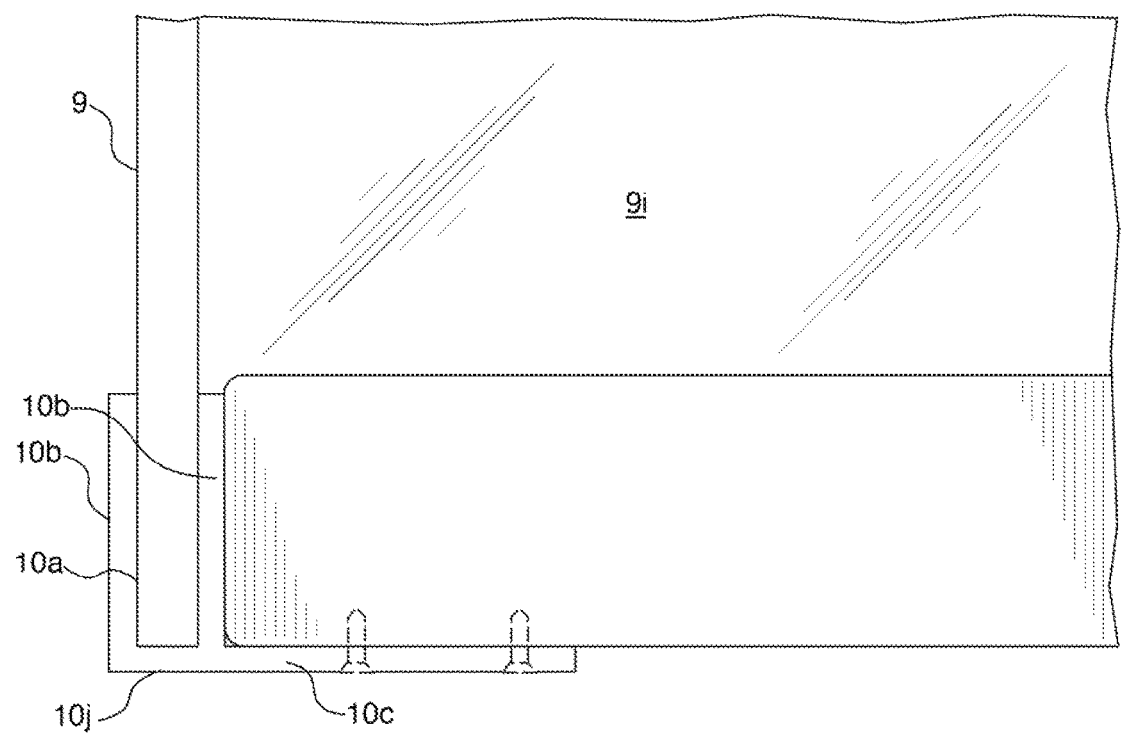
FIG. 13
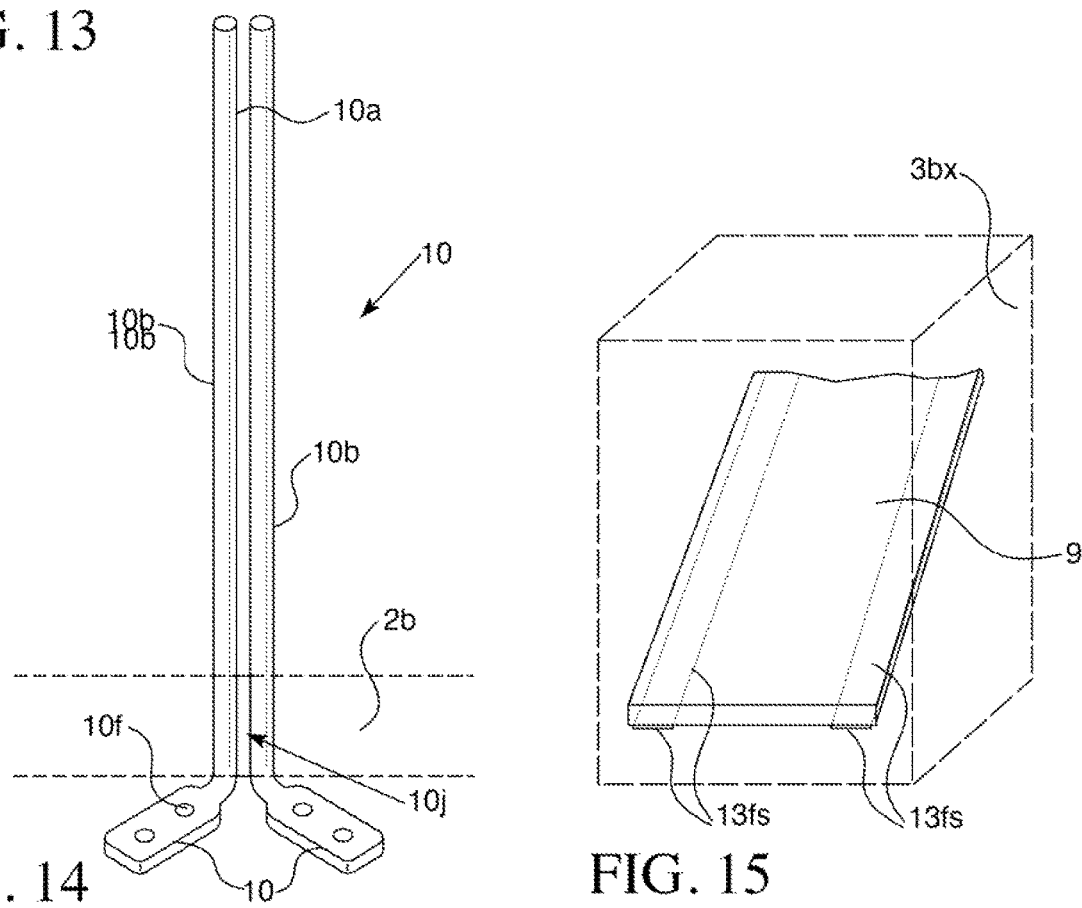
FIG. 14
FIG. 15

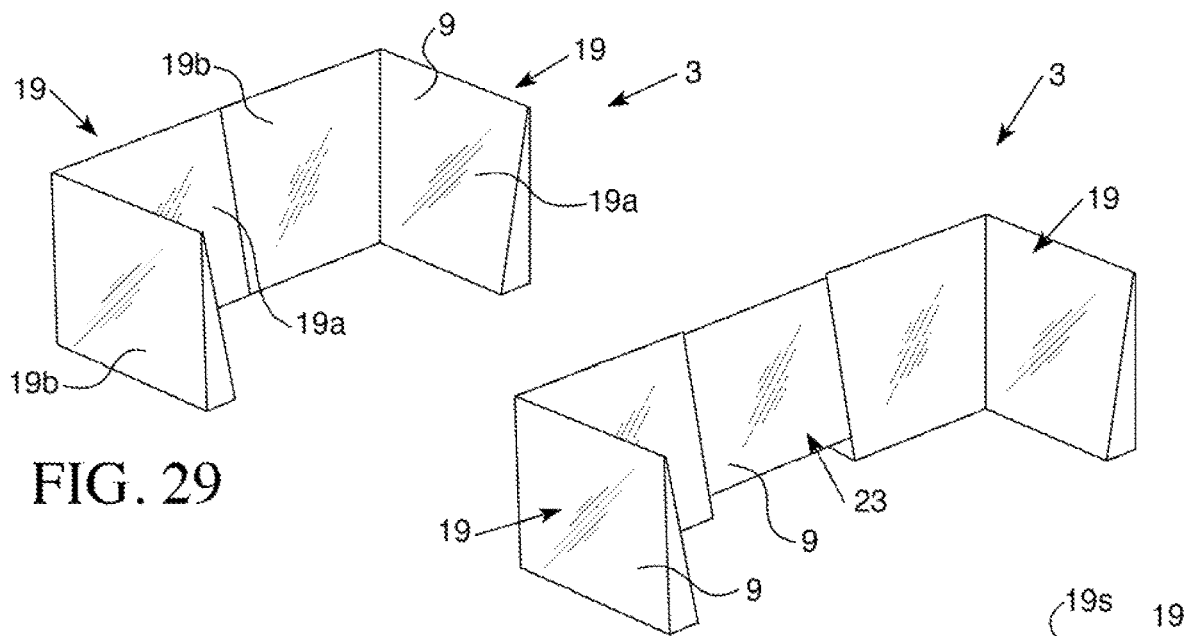
FIG. 29
FIG. 30
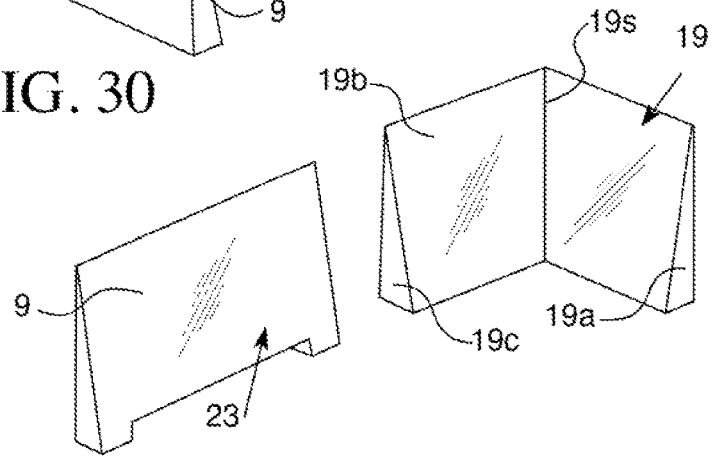
FIG. 31
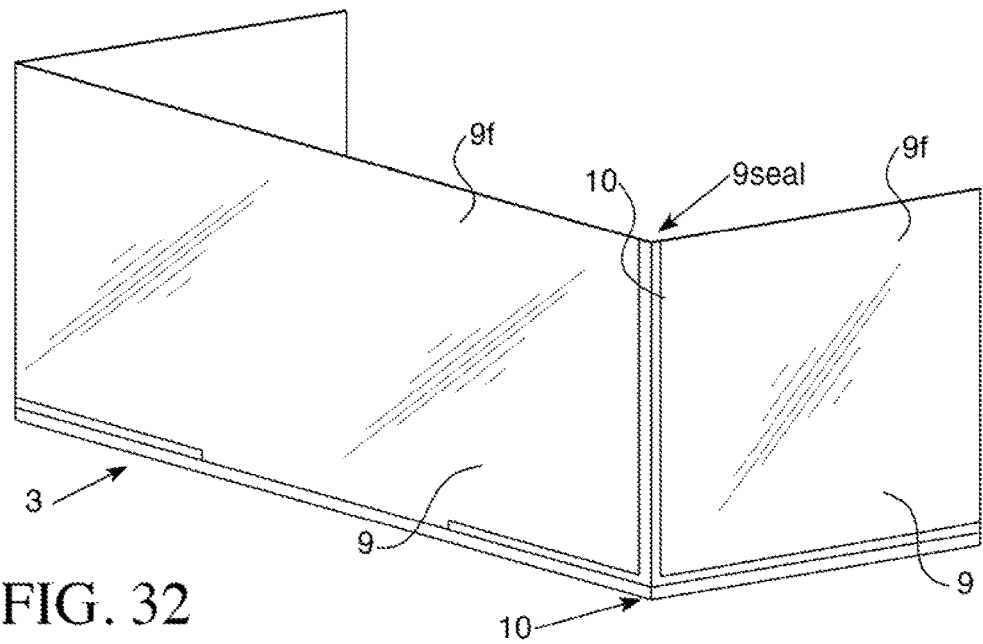
FIG. 32

SCREEN ATTACHMENT APPARATUS, KIT FOR QUICK DEPLOYMENT OF A SCREEN APPARATUS THAT CAN PROVIDE BIOHAZARD PROTECTION AND/OR PRIVACY AND METHOD OF POSITIONING A PRIVACY SCREEN ADJACENT A WORK SURFACE

CROSS-REFERENCE TO RELATED APPLICATIONS

The present application claims priority to U.S. Provisional Patent Application No. 63/016,090, filed on Apr. 27, 2020. The entirety of this provisional patent application is incorporated by reference herein.

FIELD

The present innovation relates to privacy screens and methods and mechanisms used to attach privacy screens adjacent to a work surface of an articular of furniture (e.g. adjacent a desktop of a desk, adjacent a countertop of a counter, or adjacent a tabletop of a table etc.)

BACKGROUND

Privacy screens can be utilized to provide a visible barrier in a workplace setting or other setting. In the art, the term "privacy" can often refer to the ability of a screen to provide a visible barrier above a work surface (e.g. to provide a barrier to prevent seeing a person's chest or head).

A "privacy screen" can also be referred to as a "modesty screen." When a "privacy screen" is referred to as a "modesty screen," the term "modesty" term can often refer to the ability of a screen to provide a visible barrier below a work surface (e.g. to provide a barrier from seeing a person's knees or legs). Examples of privacy screens and/or privacy screen type mechanisms can be appreciated from U.S. Pat. Nos. 9,920,520, 9,163,393, 8,365,798, 7,789,025, 7,310,918, 6,896,028, 6,769,747, 6,367,213, 6,293,328, 6,002,613, 6,000,180, 5,966,879, 5,675,946, 5,680,893, 5,287,909, 4,759,520, 4,325,597, 4,248,325, and 2,821,450, U.S. Design Pat. Nos. D800,459, D796,216, D653,862, D458,040, D457,359, and D427,783 and U.S. Patent Application Publication Nos. 2020/0383501, 2019/0242182, 2018/0245334, 2017/0226749, 2016/0360882, 2012/0304441, and 2007/0033898.

SUMMARY

A screen attachment apparatus, privacy and/or biohazard screen apparatus, kit for a privacy and/or biohazard screen apparatus, and methods of making and using the same is provided. Embodiments of the apparatuses, kits, and methods can be configured to position a screen adjacent a countertop, desktop, tabletop or other work surface for providing a visible barrier and/or a biohazard barrier along at least a portion of a perimeter of such a work surface. In some embodiments, the screen attachment apparatus may be configured to attach or otherwise position a screen body adjacent to a work surface so that the screen body can be positioned along a perimeter edge of the work surface and extend above the perimeter edge of the work surface.

A privacy screen and/or biohazard screen apparatus can include a screen body and an attachment mechanism to position the screen body adjacent a perimeter edge of a work surface so that the screen body extends above the work surface. Embodiments of the privacy screen and/or biohazard screen can include any embodiment illustrated in the drawings of this application as well as other embodiments. Embodiments of kits can be provided that can be configured to include elements to install embodiments of the privacy screen and/or biohazard screen apparatus.

In some embodiments, the attachment mechanism can include an outer rail having an L-shaped profile that has a bottom section that extends inwardly from an outer upper section. The bottom section can be configured to extend along a bottom of the work surface. The outer upper section can be configured to extend vertically along the perimeter edge. The outer upper section can be configured to extend vertically along the perimeter edge to define a gap for retaining a bottom portion of the screen body between the outer upper section and the perimeter edge. In some embodiments, the upper section and the bottom section of the outer rail can be configured so that the screen body is in contact with the perimeter edge and the outer upper section while the screen body is within the gap.

In some embodiment of the apparatus, the lower end portion of the screen body can have the attachment mechanism integrated therein or at least a portion of the attachment mechanism incorporated therein. For example, in some embodiments the attachment mechanism includes a fold line defined in the lower end portion of the screen body such that a bottom portion of the screen body below the fold line is rotatable about the fold line from a non-folded position to a folded position. The bottom portion of the screen body below the fold line can be configured to extend along a bottom of the work surface when in the folded position for attachment to the work surface. A portion of the screen body can be above the fold line and be configured to extend along a perimeter edge of the work surface when the bottom portion is in the folded position.

In such embodiments, the attachment mechanism can also include at least one first strip of a releasable attachment mechanism on the bottom portion so that the first strip is contactable with a second strip of a releasable attachment mechanism on the bottom of the work surface for releasable attachment to the work surface. The attachment mechanism can also include at least one third strip of a releasable attachment mechanism on the lower end portion above the fold line so that the third strip is contactable with at least one fourth strip of a releasable attachment mechanism on the perimeter edge of the work surface for releasable attachment to the work surface. In such embodiments, each of the first, second, third, and fourth strips can be strips of Velcro material. The first and third strips can include a plurality of hooks or loops and the second and fourth strips can have a plurality of hooks or loops for forming a Velcro® type connection.

For example, in some embodiments, the attachment mechanism can include at least one first strip of a releasable attachment mechanism on the lower end portion above the fold line so that the first strip is contactable with at least one second strip of a releasable attachment mechanism on the perimeter edge of the work surface for releasable attachment to the work surface. The first strip is a strip can include or contain a plurality of loops and the second strip can be a strip that includes or contains a plurality of hooks for releasable fastening with the loops. Alternatively, the first strip can be a strip containing or including a plurality of hooks and the second strip can be a strip containing a plurality of loops for releasable fastening with the hooks of the first strip.

In other embodiments of the privacy screen and/or biohazard screen apparatus, the attachment mechanism can include a first J-shaped body joined to a second J-shaped body to define a gap for retaining the screen body. The first J-shaped body can be joined to the second J-shaped body via a joined portion defined so that the gap is above the joined portion.

In some embodiments of the privacy screen and/or biohazard screen apparatus, the attachment mechanism can include a rail body having an "F" shaped profile defined by a first member extending from the rail body that is spaced apart from a second member extending from the rail body to define a gap between the first member and the second member. The screen body can be positioned within the gap. In some embodiments, the screen body can be considered a first screen body and there may be additional screen bodies (e.g. a second screen body, a third screen body, etc.) included in the apparatus as well. For instance, there can be a second screen body positioned to abut the second member of the rail body having the "F" shaped profile and also contact the rail body for being positioned next to the first screen body within the gap for forming a corner that is covered by the rail body.

In some embodiments of the privacy screen and/or biohazard screen apparatus, the attachment mechanism can include an attachment member having a channel defined therein. The attachment member can be attachable to a top of a work surface via a double sided tape or other type of fastening mechanism. The attachment member in some embodiments can be a U-shaped member that has a bottom and spaced apart sidewalls that define the channel therein so that the top of the channel is open or in communication with an upper slot or mouth that is sized to receive a lower portion of the screen body. The screen body's lower portion can be retainable within the channel via an interference fit therein. In some embodiments, one or more shim members can be included between the screen body and a sidewall of the attachment member to help facilitate a sufficiently tight interference fit.

In yet other embodiments, the attachment mechanism of the privacy screen and/or biohazard screen apparatus can include a second screen body having holes defined within a lower portion of the second screen body. A plurality of projection members can extend from the first screen body so each of the projection members is passable through a respective one of the holes to connect the second screen body to the first screen body. In some embodiments, the projection members can be fasteners (e.g. bolts or screws, etc.). Each of the holes can include a first dimensioned opening in communication with a second dimensioned opening that is smaller than the first dimensioned opening to define a keyhole. A distal end of the projection member can be passable through the first dimensioned opening and an intermediate portion of the projection member extending from the distal end can be moveable from the first dimensioned opening to the second dimensioned opening for locking the second screen body into position adjacent the first screen body. The projection members can be rotatable to tighten the projection members within the second dimensioned openings of the holes.

In yet other embodiments of the privacy screen and/or biohazard screen, the attachment mechanism can include an attachment body having projection members extending from the body of the attachment mechanism. The screen body can have holes defined within a lower portion of the screen body. Each of the holes can include a first dimensioned opening in communication with a second dimensioned opening that is smaller than the first dimensioned opening to define a keyhole. Each of the projection members can have a distal end that is passable through the first dimensioned opening and an intermediate portion of the projection member extending from the distal end that is moveable from the first dimensioned opening to the second dimensioned opening for locking the screen body into position adjacent the attachment body. The projection members can be rotatable to tighten the projection members within the second dimensioned openings of the holes so that the distal ends of the projection members are positioned on the inner face of the screen body via movement of the distal end of the projection member $10s$ closer to the attachment mechanism body so that an outer face of the screen body is moved closer to and/or in contact with the body of the attachment mechanism.

In embodiments of the privacy screen and/or biohazard screen apparatus, the screen body can be comprised of foam material, polymeric material, paper material (e.g. cardboard), or other material. For example, in some embodiments the screen body can be comprised of cardboard or a clear polymeric material (e.g. plexiglass or a clear acrylic plastic material, etc.). As another example, the screen body can be an acrylic sheet, a glycol modified version of polyethylene terephthalate (PETG) sheet, a polypropylene sheet, or a corrugated polypropylene sheet. In some embodiments the screen body can be opaque. In other embodiments, the screen body can be clear.

In embodiments of the privacy screen and/or biohazard screen apparatus, the apparatus can also include other elements. For instance, there can be a second screen body positionable adjacent the first screen body and a first flexible strip configured to connect the first screen body to the second screen body to cover a gap defined between immediately adjacent edges of the first screen body and the second screen body. The first flexible strip can have at least one recess region to define a joint about which the strip is moveable from a first position at which the first flexible strip extends linearly along a length of the first flexible strip to a second position. In other embodiments, the first flexible strip can include a first portion and a second portion. The at least one recess region can include a first recess region defined between the first portion and the second portion to define a first joint that extends along a substantial portion of a length of the first flexible strip and the first recessed region can be configured to permit the first portion and the second portion to be moved about the first joint defined by the recessed region to move the first flexible strip from a first position in which the first flexible strip linearly extends to a second position at which the first portion extends at an angle of between 15°-165° from the second portion via the first joint.

A privacy screen and/or biohazard screen apparatus is provided that includes a first screen body having a triangular cross-sectional shape and an inner channel defined therein that is triangular in shape. The first screen body can be configured to be positionable on a work surface. A second screen body having a triangular cross-sectional shape can be configured to be moveably positioned within the inner channel of the first screen body. The second screen body can be telescopingly positionable within the inner channel to facilitate extending the second screen body out of the inner channel or retracting the second screen body further within the inner channel.

A third screen body having a triangular cross-sectional shape and an inner channel defined therein that is triangular in shape can also be included in embodiments of the privacy screen apparatus. The third screen body can be configured to be positionable on the work surface. The second screen body can be configured to be moveably positioned within the inner channel of the first screen body to adjustably extend between the inner channel of the first screen body and the inner channel of the third screen body.

Other embodiments of the privacy screen and/or biohazard screen apparatus can include a first end screen body having a first portion that extends at an angle relative to a second portion to be positioned adjacent to peripheral edges of a work surface that meet at a first corner of the work surface. The apparatus can also include a second end screen body having a first portion that extends at an angle relative to a second portion to be positioned adjacent to peripheral edges of a work surface that meet at a second corner of the work surface that is on a side of the work surface opposite the first corner. An intermediate screen body can also be included. The first portion of the first end screen body can be spaced apart from a first portion of the second end screen body by a gap. The intermediate screen body can be positionable between the first portions of the first and second end screen bodies to cover the gap.

Embodiments of the privacy screen and/or biohazard screen apparatus can also include a first top attachment mechanism that attaches an upper edge of the intermediate screen body to an upper edge of the first portion of the first end screen body and a second top attachment mechanism that attaches the upper edge of the intermediate screen body to an upper edge of the first portion of the second end screen body. There can also be stand elements connected to lower edges of the first end screen body, the second end screen body, and the intermediate screen body.

Some embodiments of the kit for assembling a privacy screen and/or biohazard screen apparatus can be configured to facilitate installation of one or more embodiments of the privacy screen and/or biohazard screen apparatus (e.g. embodiments discussed herein). Embodiments of the kit can include a plurality of screen bodies including a first screen body and a second screen body, and/or a plurality of flexible strips. The flexible strips can include a first flexible strip configured to connect the first screen body to the second screen body to cover a gap defined between immediately adjacent edges of the first and second screen bodies privacy screen bodies for forming the privacy screen and/or biohazard screen apparatus for positioning on or adjacent a work surface. The flexible strips can also include a second flexible strip and a third flexible strip. The second flexible strip can be configured to connect the first screen body to the work surface and the third flexible strip can be configured to connect the second screen body to the work surface.

Other embodiments of the kit for assembling a privacy screen and/or biohazard screen apparatus can include a plurality of screen end bodies including a first end screen body and a second end screen body. Each of the screen end bodies can have an "L" shape in which a first portion that is shorter than a second portion extends away from the first portion at a pre-selected angle. The kit can also include at least one intermediate screen body that is positionable between the first end screen body and the second end screen body.

The pre-selected angle can be defined by a curved portion of the end screen body positioned between the first and second portions of the end screen body. The first portion of each end screen body can be sized to extend a distance of up to 24 inches adjacent a first peripheral edge of a work surface and the second portion of each end screen body can be sized to extend a distance of up to 30 inches adjacent a second peripheral edge of the work surface.

Other embodiments of the kit can include elements of the privacy screen apparatus and/or biohazard apparatus. For instance, a kit can include one or more screen bodies and one or more attachment mechanisms. Such kits can also include one or more flexible strips.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of privacy screen and/or biohazard screen apparatuses, screen attachment apparatuses, and kits for such apparatuses are shown in the accompanying drawings and certain exemplary methods of making and practicing the same are also illustrated therein. It should be appreciated that like reference numbers used in the drawings may identify like components.

FIG. 13 is cross-sectional view illustrating an exemplary screen attachment mechanism of the privacy screen and/or biohazard screen apparatus shown in FIG. 12.

FIG. 14 is a perspective schematic view of the exemplary screen attachment mechanism shown in FIGS. 12 and 13.

FIG. 15 is a perspective view of an exemplary embodiment of a kit for an exemplary embodiment of a privacy screen and/or biohazard screen apparatus 3.

FIG. 21 illustrates the flexible strip 13*fs* in a first position.

FIG. 29 is a perspective view of an exemplary embodiment of a privacy screen and/or biohazard screen apparatus 3.

FIG. 30 is a view similar to FIG. 29 with an intermediate screen body 23 positioned to extend between first and second screen bodies 19 via inner channels 19*c* defined in the first and second screen bodies 19.

FIG. 31 is an exploded fragmentary view of the embodiment shown in FIG. 30 to illustrate the intermediate screen body 23 and its configuration for telescoping positioning in the inner channel 19*c* of another screen body 19.

FIG. 32 is a perspective view of the exemplary embodiment of a privacy screen and/or biohazard screen apparatus 3.

DETAILED DESCRIPTION OF EXEMPLARY EMBODIMENTS

Figure 1:
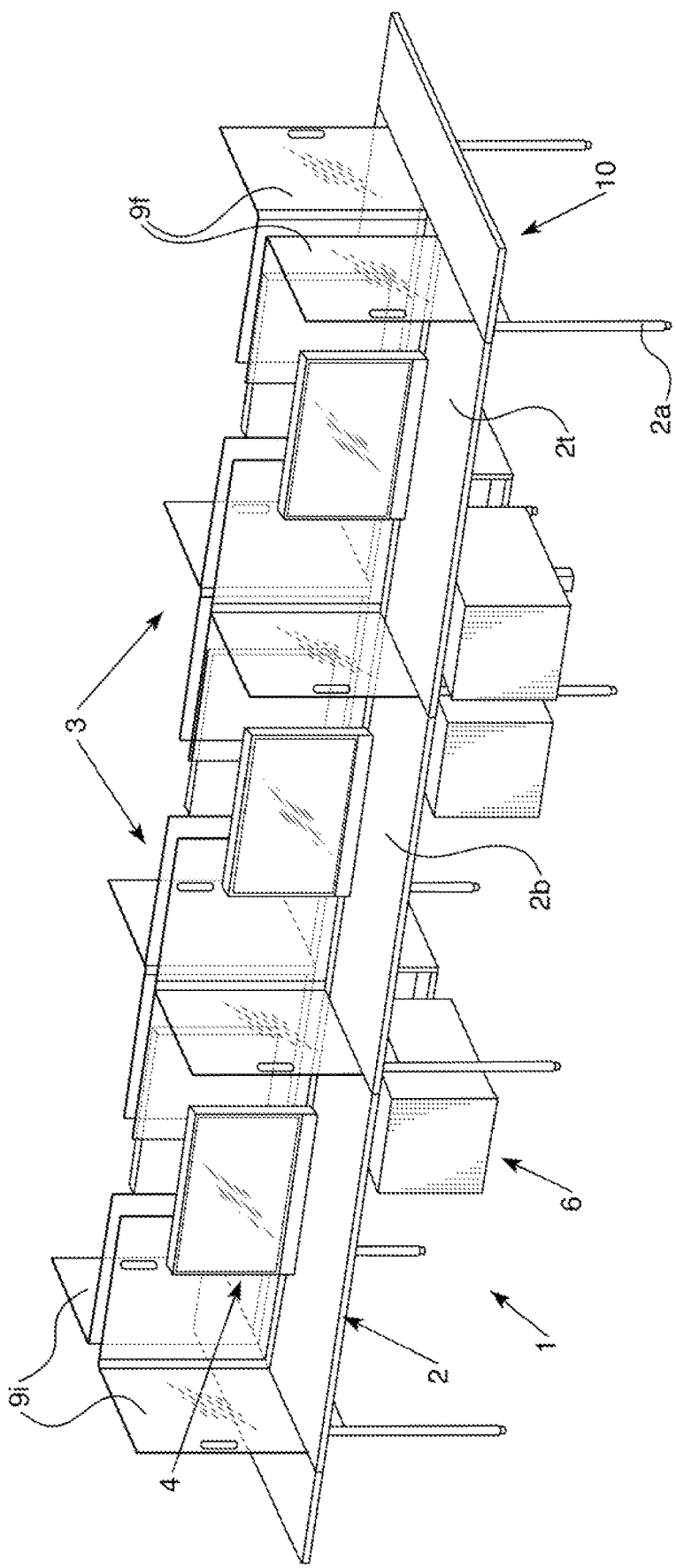
FIG. 1 is a perspective view of a first office furniture arrangement that utilizes an exemplary embodiments of a privacy screen and/or biohazard screen apparatus having a screen attachment apparatus for attaching a screen body adjacent a work surface.
Figure 2:
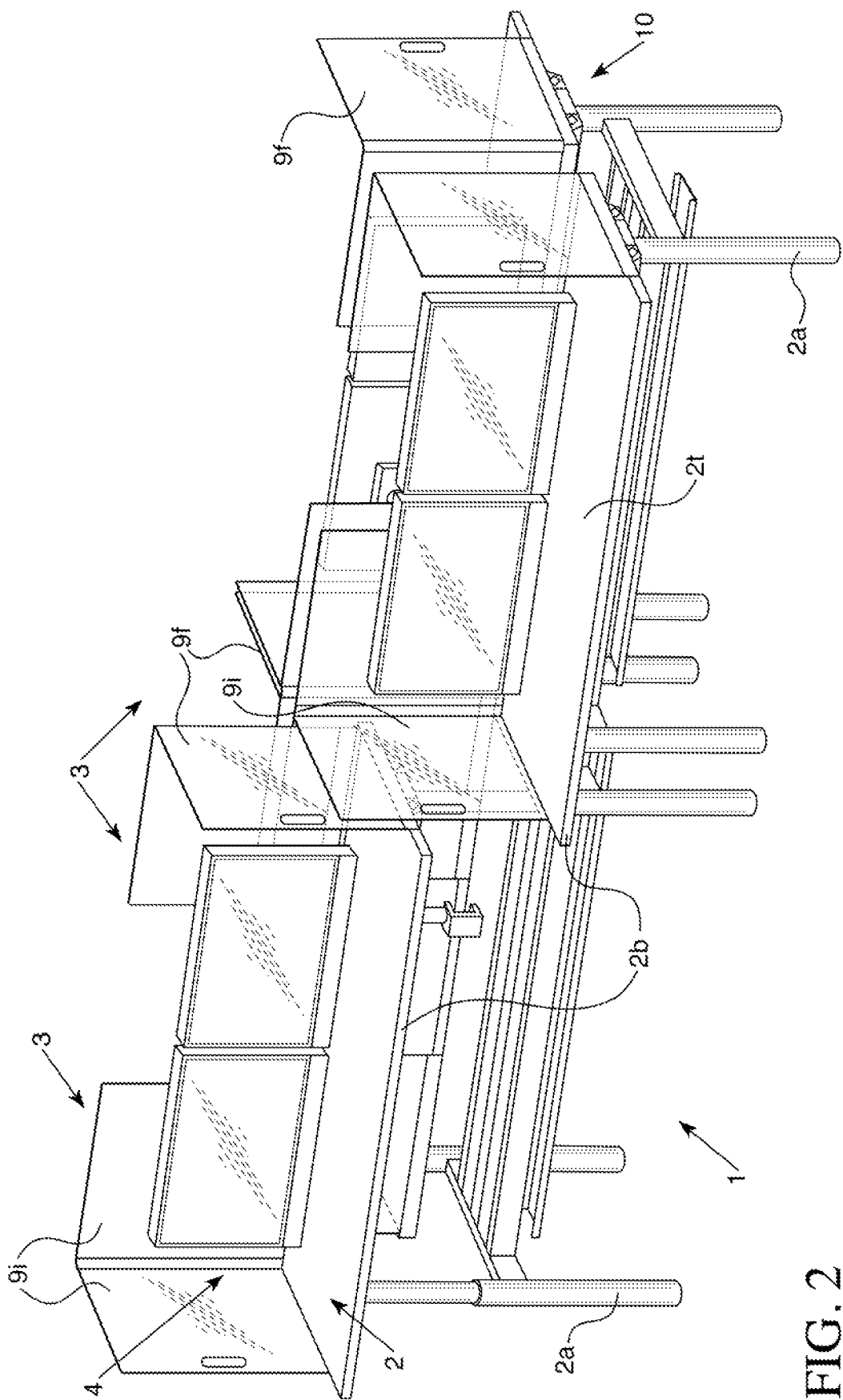
FIG. 2 is a perspective view of a second office furniture arrangement that utilizes an exemplary embodiment of the privacy screen and/or biohazard screen apparatus having a screen attachment apparatus for attaching a screen body adjacent a work surface.
Figure 3:
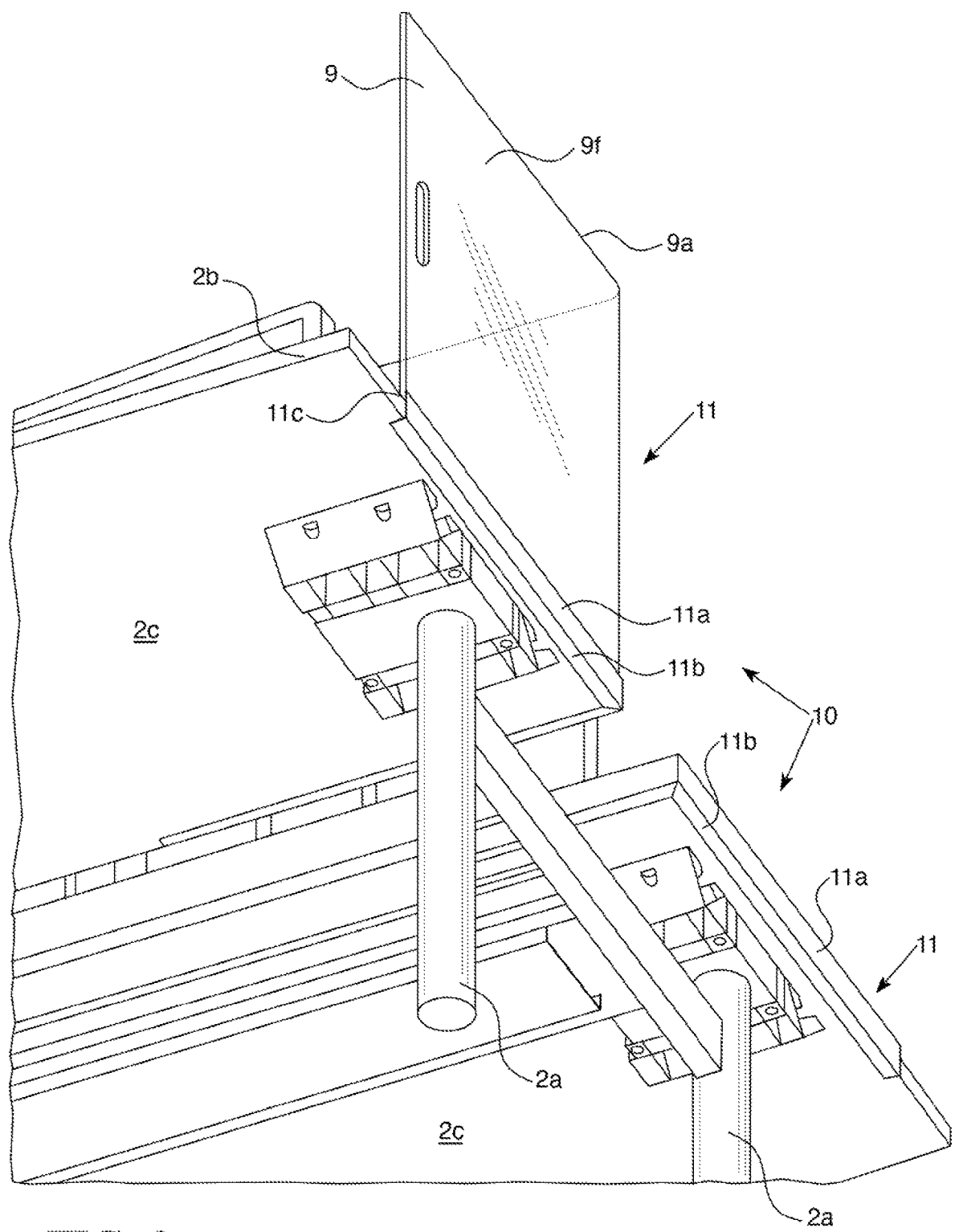
FIG. 3 is a lower fragmentary view of the office furniture arrangement shown in FIG. 2 to illustrate an exemplary attachment mechanism of the privacy screen and/or biohazard screen apparatus.
Figure 4:
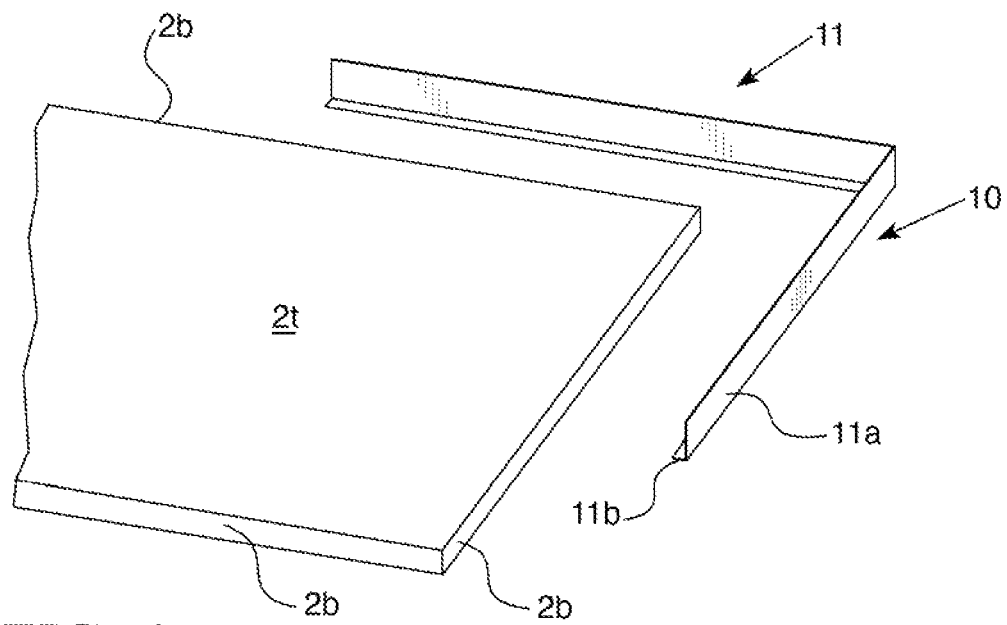
FIG. 4 is an exploded view of a first exemplary embodiment of the attachment mechanism for attaching a screen body adjacent a work surface.
Figure 5:
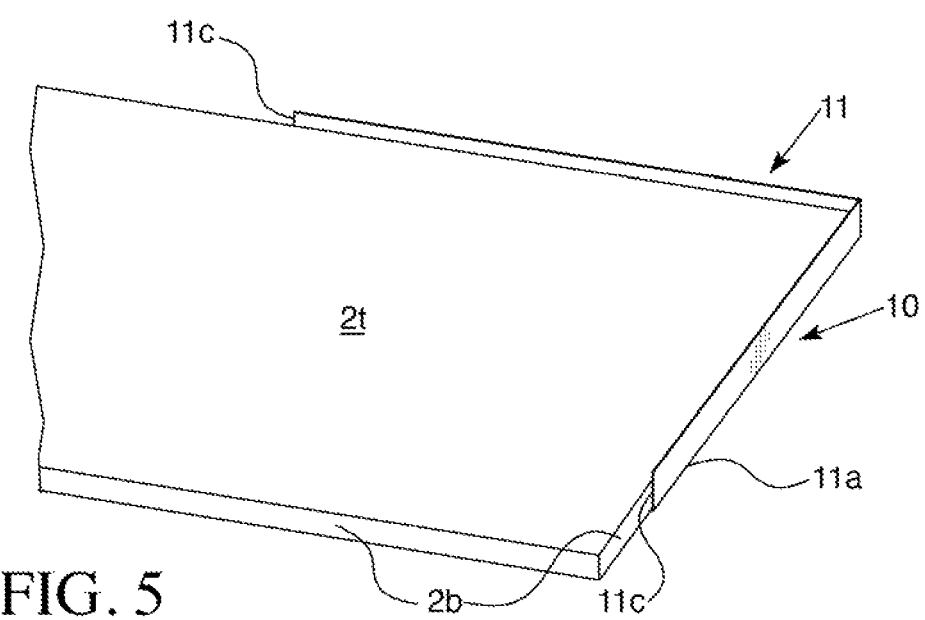
FIG. 5 is a view similar to FIG. 4 that provides perspective view of the first exemplary embodiment of the attachment mechanism for attaching a screen body attached adjacent a work surface.
Figure 6:
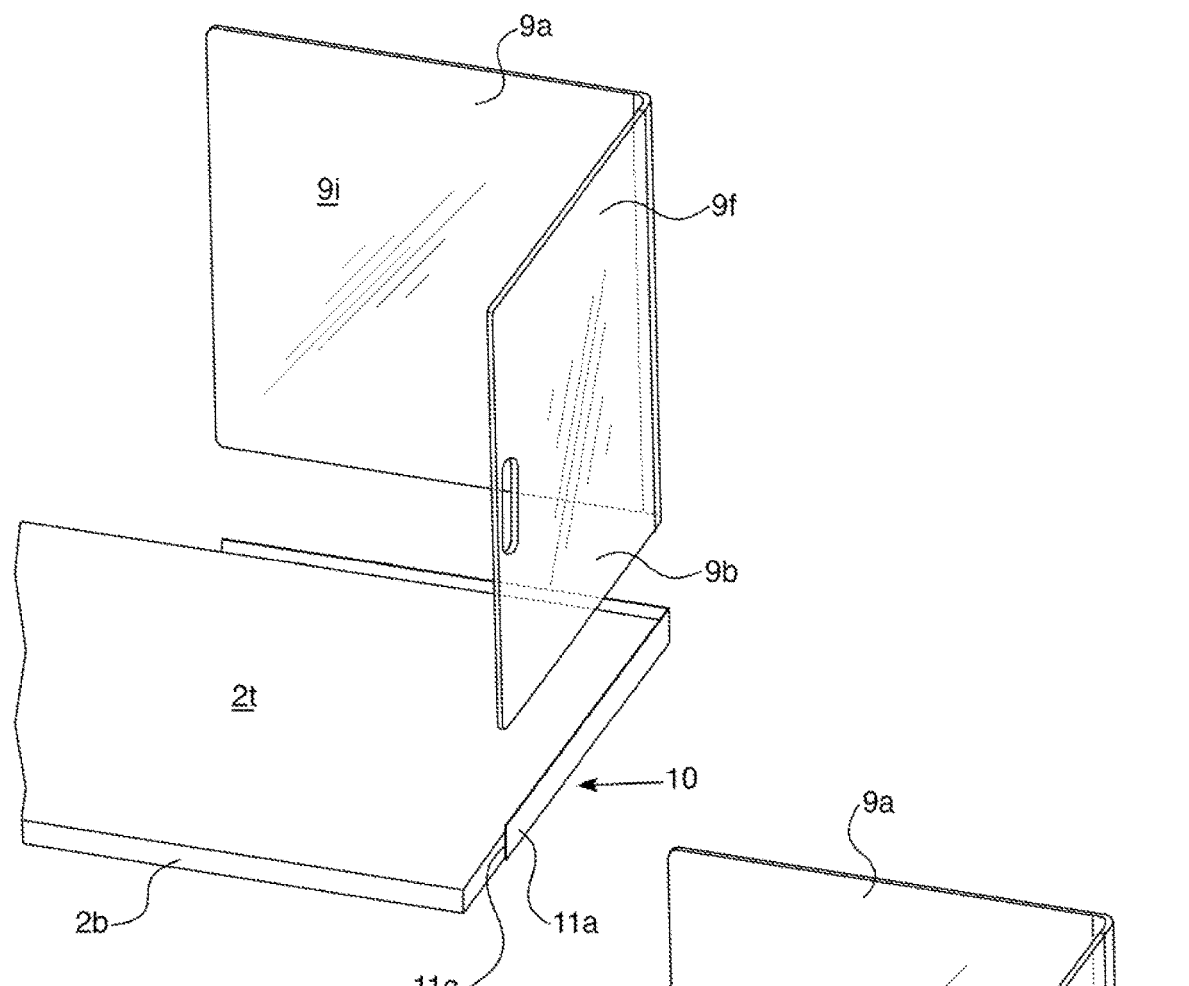
FIG. 6 is an exploded view similar to FIG. 4 of an exemplary screen body positioned adjacent a perimeter edge of a work surface via the first exemplary embodiment of the attachment mechanism for attaching a screen body attached adjacent a work surface.
Figure 7:
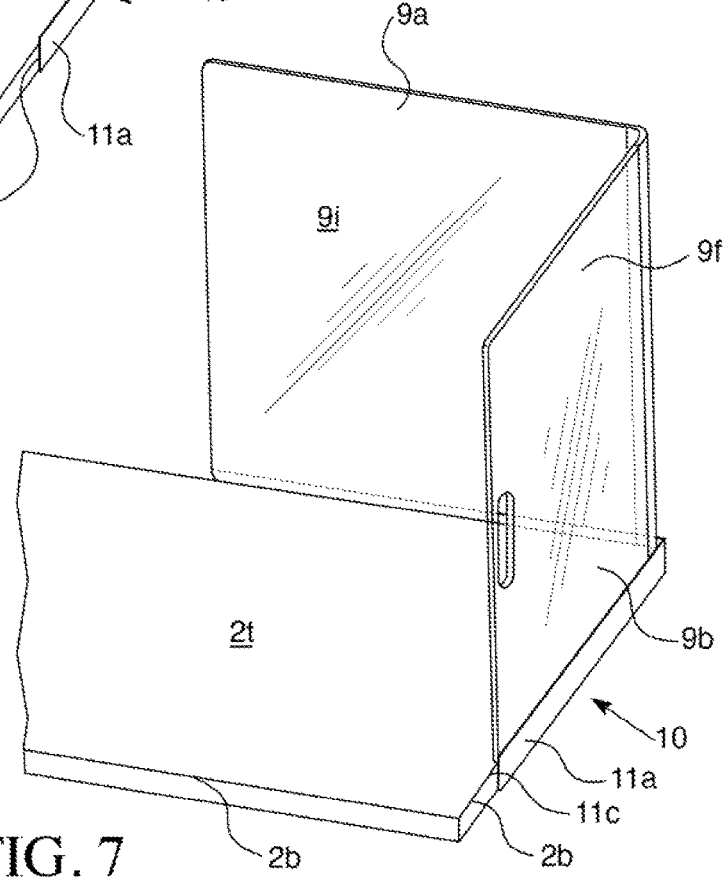
FIG. 7 is a perspective view similar to FIG. 5 that illustrates an exemplary screen body positioned adjacent a perimeter edge of a work surface via the first exemplary embodiment of the attachment mechanism for attaching a screen body attached adjacent a work surface.
Figure 8:
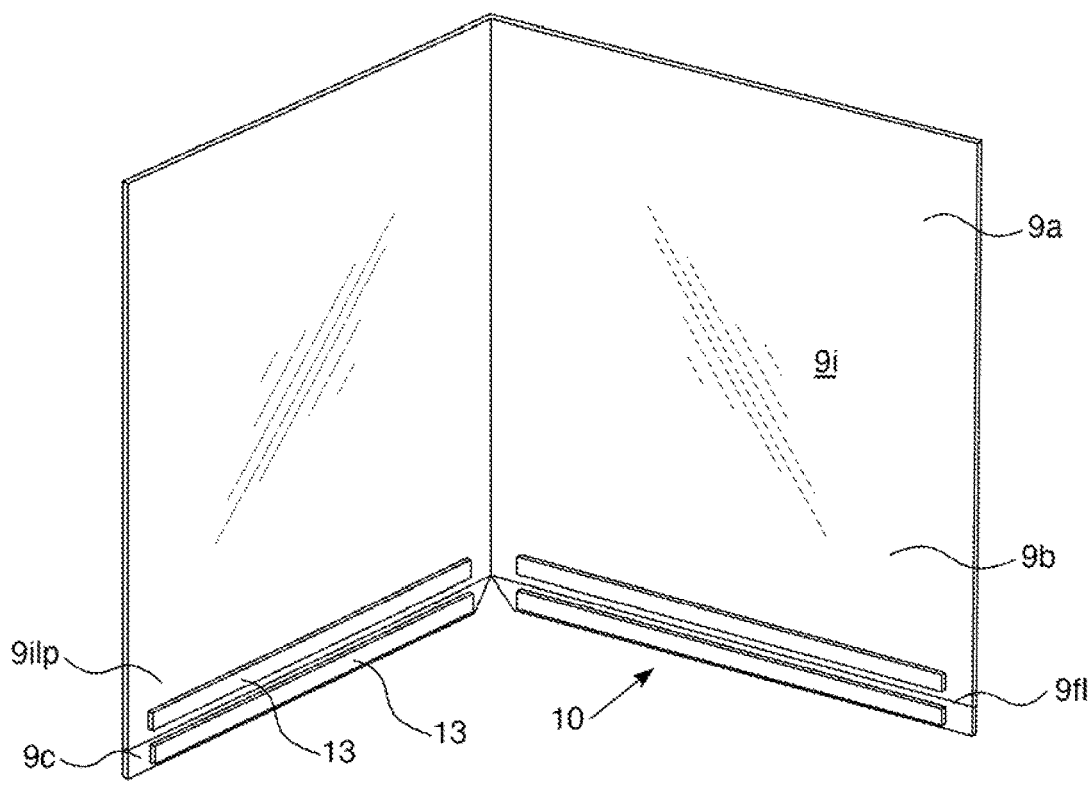
FIG. 8 is a perspective view of a second exemplary embodiment of the privacy apparatus having a bottom that includes a foldable screen attachment apparatus for attaching the screen body adjacent a work surface with the foldable screen attachment apparatus in a non-folded position.
Figure 9:
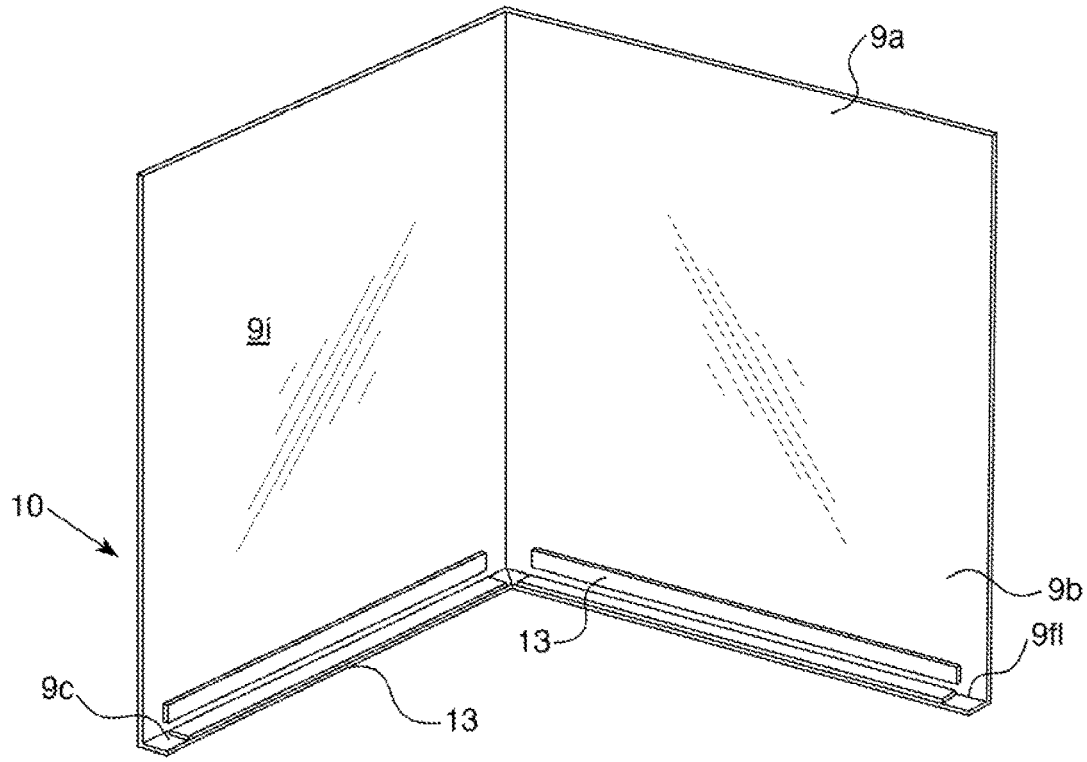
FIG. 9 is a perspective view of the second exemplary embodiment of the privacy apparatus similar to FIG. 8 with the bottom foldable screen attachment apparatus in a folded position.
Figure 10:
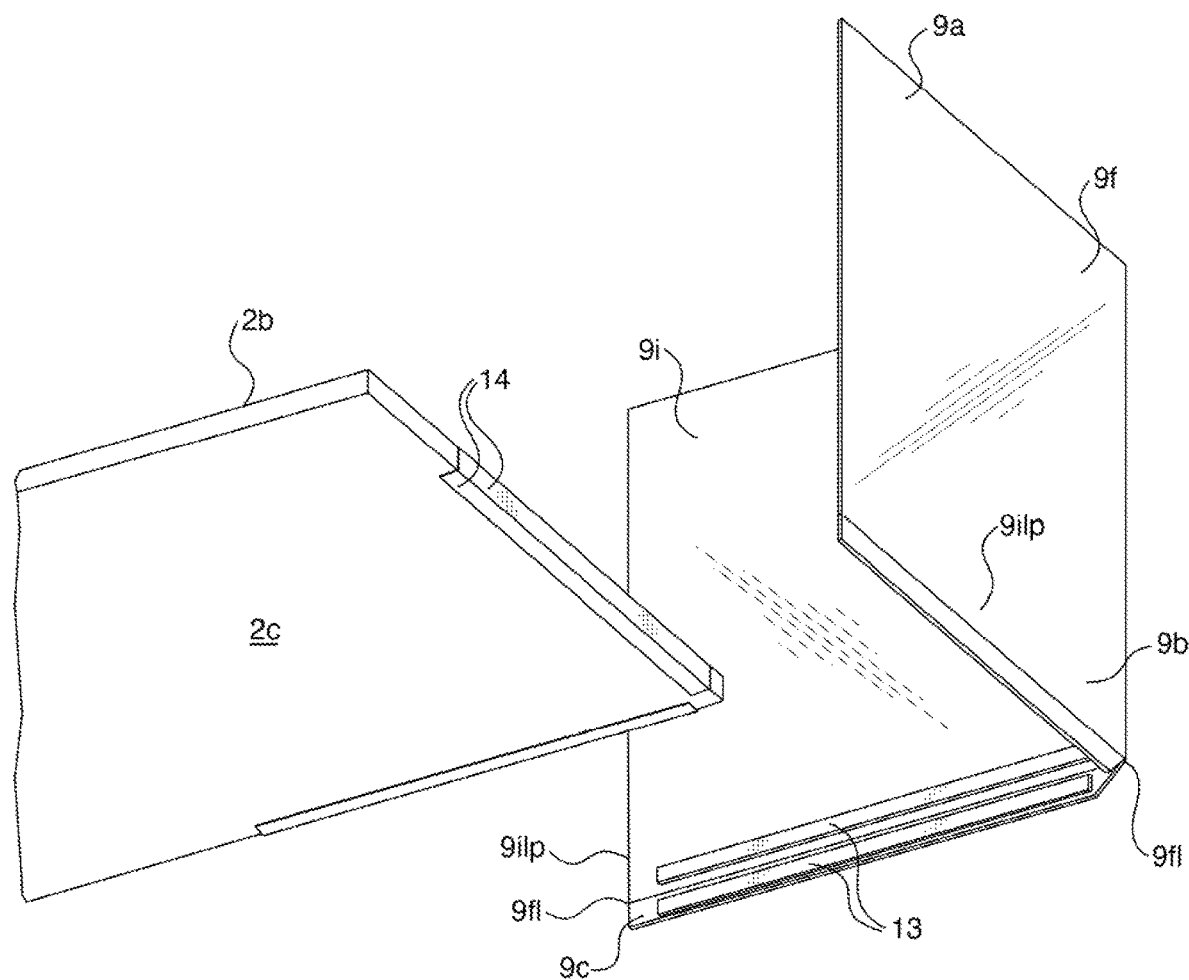
FIG. 10 is an exploded view of the second embodiment of the privacy apparatus positioned for attachment to a work surface.
Figure 11:
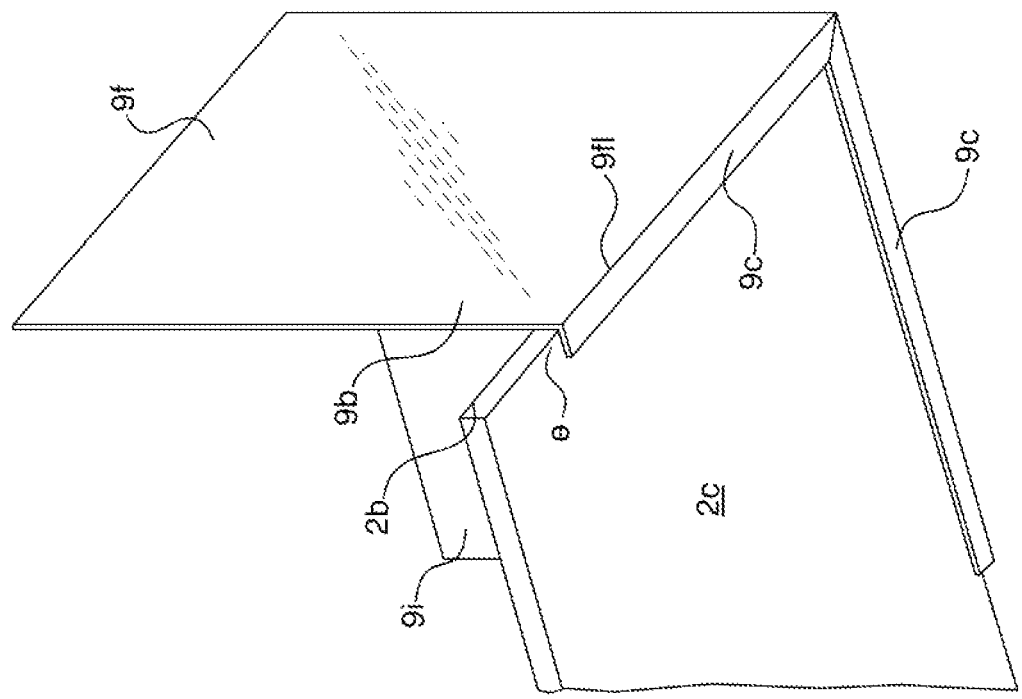
FIG. 11 is a perspective view illustrating the second embodiment of the privacy apparatus positioned for attachment to a work surface via the folding of the bottom foldable screen attachment apparatus.
Figure 11:
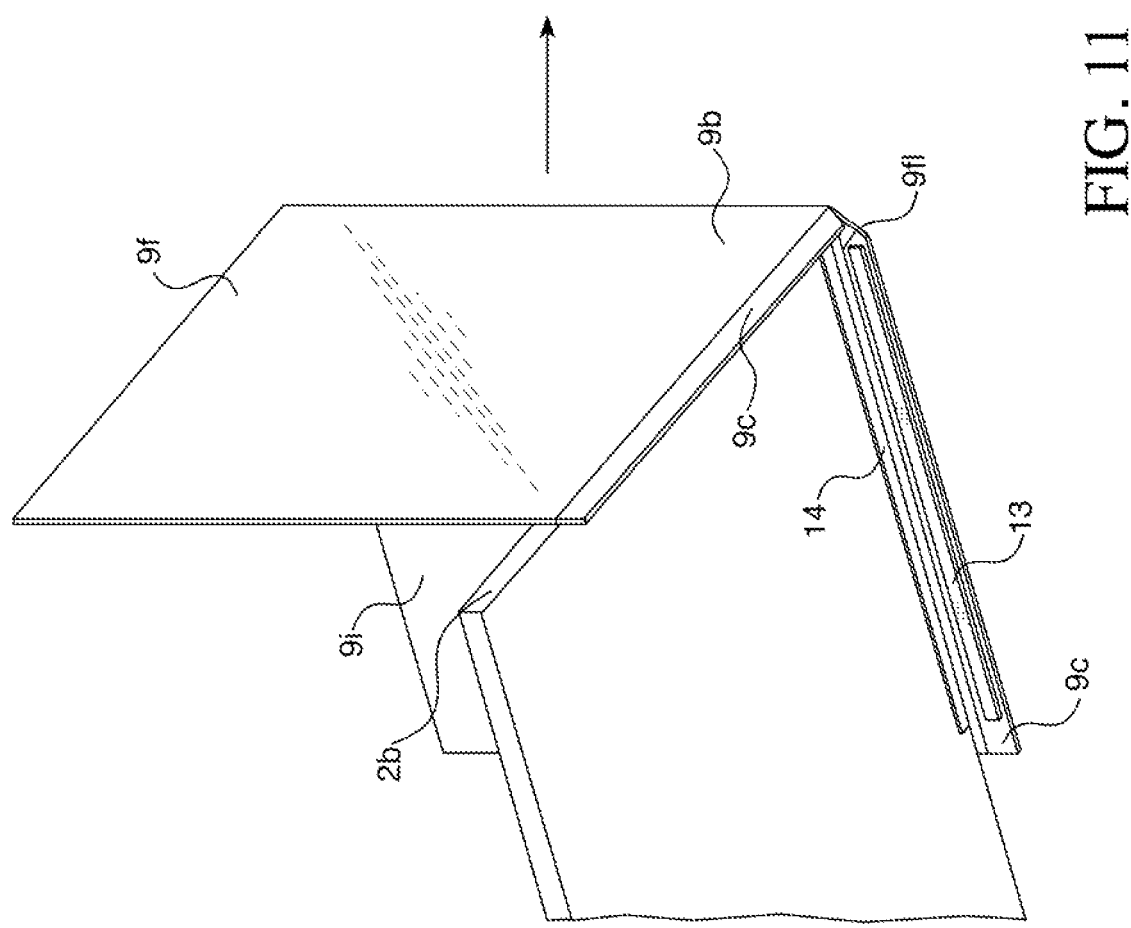
Figure 12:
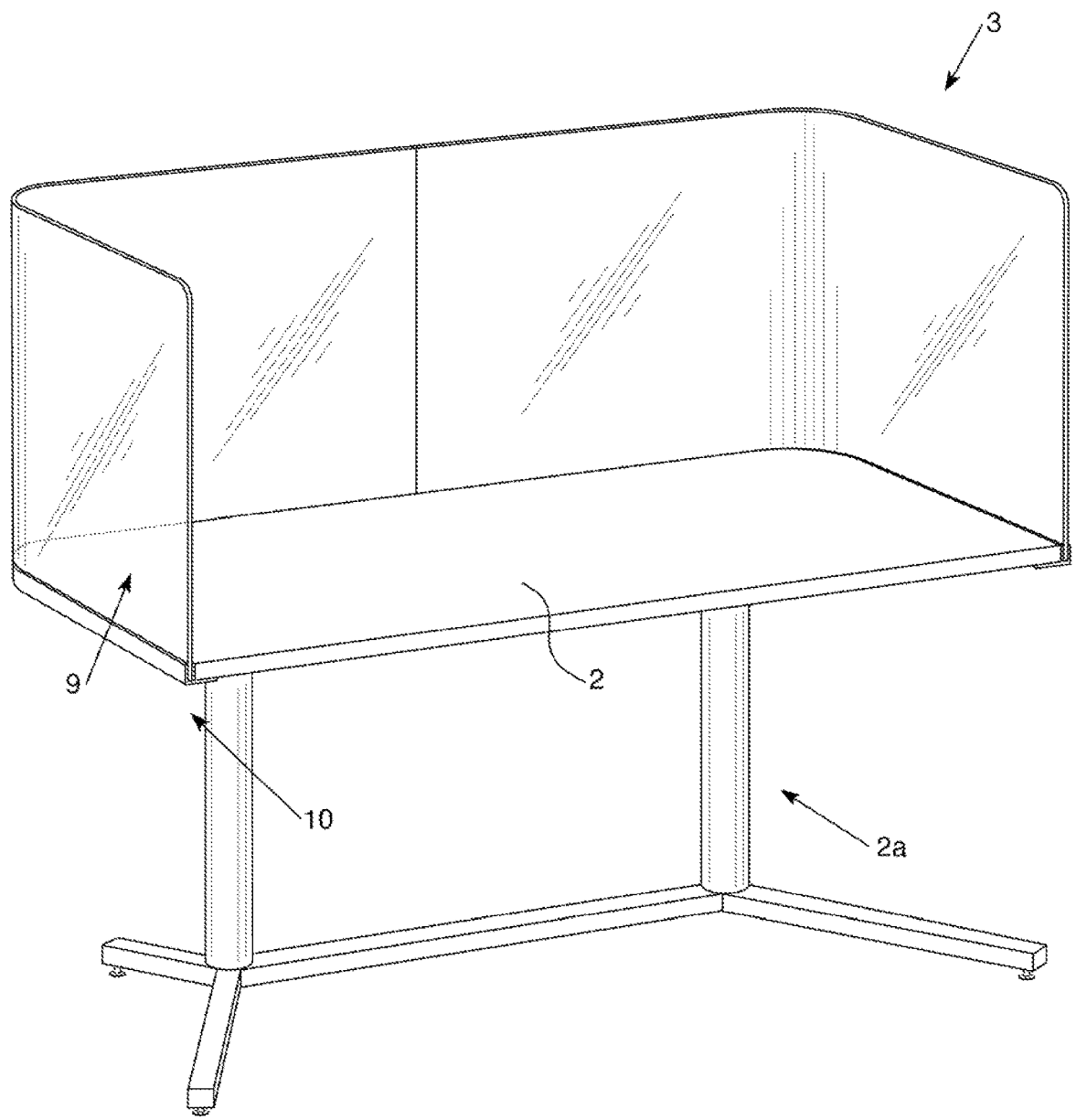
FIG. 12 is perspective view of an exemplary article of furniture that has a work surface and exemplary privacy screen and/or biohazard screen apparatuses attached to the work surface.

Referring to FIGS. 1-41, an arrangement of office furniture 1 can include at least one privacy screen and/or biohazard screen apparatus 3 connected to or positioned adjacent work surfaces 2. The work surfaces 2 can be tabletops, desktops, or countertops in some embodiments. A display 4 (e.g. computer or computer monitor) or other tools can be positioned on the work surface 2.

Each of the work surfaces 2 can be supported by a base. The base can include a plurality of legs 2*a* in some embodiments. Storage devices 6 or other components can also be provided adjacent to or under the work surface 2. Each work surface 2 can have at least one perimeter edge 2*b* that defines the outer boundary of the work surface 2. For example, rectangular work surfaces can have four perimeter edges, circular or oval work surfaces can have a single perimeter edge 2*b*, and other shaped work surfaces 2 can have more than one perimeter edge 2*b*. Each work surface 2 can have a top 2*t* and a bottom 2*c*. In some embodiments, each privacy screen and/or biohazard screen apparatus 3 can be positioned to permit a worker to work at one peripheral edge or peripheral edge portion of a work surface while enclosing the rest of the work surface/peripheral edge region(s).

Each privacy screen and/or biohazard screen apparatus 3 can include a privacy screen body 9 and a privacy screen body attachment mechanism 10. The privacy screen body 9 can include a body that has a top portion 9*a* and a lower portion 9*b*. The lower portion 9*b* can include a bottom portion 9*c* or can be a lower intermediate portion that is between the bottom portion 9*c* and the top portion 9*a*. The privacy screen body 9 can include opposite faces defined between the bottom and top sides of the privacy screen body. For instance, the privacy screen body can have an outer face 9*f* and an inner face 9*i*. The inner face 9*i* can face toward the work surface 2 and the outer face 9*f* can face in an opposite direction away from the inner face 9*i* and away from the work surface 2 when the privacy screen body is positioned adjacent a perimeter edge 2*b* of the work surface 2. The inner face 9*i* and the outer face 9*f* can each extend between the top and bottom of the privacy screen body 9 and the left and right sides of the body on opposite sides of the body to define the inner and outer faces of that body.

The privacy screen body attachment mechanism 10 can be configured to position the privacy screen body adjacent to and/or in contact with the perimeter edge 2*b* of the work surface so a top portion 9*a* of the privacy screen body 9 extends from adjacent the perimeter edge 2*b* and is positioned above the top 2*t* of the work surface 2. In some embodiments, the privacy screen body attachment mechanism 10 can include an outer rail 11 that can have an L-shaped profile that has a bottom section 11*b* that extends inwardly from an outer upper section 11*a*. The bottom section 11*b* can be sized and configured to extend along a portion of the bottom 2*c* of the work surface. The upper section 11*a* can be configured to extend upwardly along the perimeter edge 2*b* of the work surface to define a gap 11*c* between the upper section 11*a* and the perimeter edge 2*b* that is sized to provide an interference fit for a bottom portion 9*c* of the privacy screen body 9 to retain the privacy screen body adjacent the perimeter edge 2*b*. For example, the gap 11*c* can be sized so that the bottom portion 9*c* of the privacy screen body 9 can be inserted into the gap and tightly held therein via friction (e.g. an interference fit therein) without requiring use of a mechanical fastener or an adhesive.

The bottom section 11*b* of the outer rail 11 can be configured for attachment to the bottom 2*c* of the work surface via an adhesive, at least one fastener, and/or a releasable attachment mechanism (e.g. a Velcro type material that can include a plurality of hooks for releasable attachment to a plurality of loops). When a Velcro-type material is utilized as a releasable attachment mechanism, at least one first strip 13 of a plurality of hooks can be on the upper side of the bottom section 11*b* of the outer rail for contacting at least one corresponding second strip 14 of a plurality of loops positioned on the bottom 2*c* of the work surface. Alternatively, at least one first strip 13 of a plurality of loops can be on the upper side of the bottom section 11*b* of the outer rail 11 for contacting at least one corresponding second strip 14 of a plurality of books on the bottom 2*c* of the work surface.

In some embodiments, the privacy screen body can be comprised of a lightweight material such as cardboard or a plastic sheet (e.g. an acrylic sheet, a glycol modified version of polyethylene terephthalate (PETG), a polyethylene terephthalate (PET), a polypropylene sheet, a corrugated polypropylene sheet, another type of polymeric material that can provide a lightweight body) or a fabric sheet. The outer rail 11 can be comprised of a hardboard (e.g. a kind of engineered wood made of steam-cooked and pressure-molded wood fibers such as Masonite wood, or other type of hardboard) or other type of rail material (e.g. metal, wood, a plastic that may be harder or tougher than the material of the privacy screen body 9, etc.). The upper section 11*a* of the outer rail 11 can be sized, shaped, and/or covered to provide a desired aesthetic effect for positioning along the perimeter edge(s) 2*b* of the work surface.

In some embodiments, the attachment mechanism 10 can be configured as a screen body retention mechanism such that that gap 11*c* is defined between the top of the work surface and an upper edge of the outer rail 11 such that a portion or the rail extends over the work surface to define a retention lip that extends above the peripheral edge of the work surface. The retention lip can be configured to contact a bottom of the screen body 9 that may slide along the work surface 2 to prevent the screen body 9 from falling off the work surface 2.

In some embodiments, the privacy screen body 9 can include the attachment mechanism 10 as an integral portion of the privacy screen body 9. Such an embodiment can be particularly advantageous for flexible privacy screen bodies 9 (e.g. cardboard bodies, corrugated polypropylene bodies, flexible polymeric or elastomeric bodies) that can be formed to have a foldable bottom portion 9*c* that can be folded from a non-folded position to a folded position along a fold line 9*fl* defined in the lower end portion of the privacy screen body 9 so that the bottom portion 9*c* below the intermediate lower end portion 9*ilp* is moveable from a non-folded state to a folded position at which the bottom portion 9*c* can extend inwardly relative to the lower end portion 9*ilp* via folding along the fold line 9*fl*. In some embodiments, the folding motion along the fold line 9*fl* can result in the bottom portion 9*c* being moved angularly along a path of rotation of a pre-selected angle θ. The pre-selected angle can be 90° or another angle between 60° and 110° so that rotation of the bottom portion 9*c* about the fold line 9*fl* along this rotational path of motion occurs when the bottom portion 9*c* is moved from a non-folded position to a folded position. In other embodiments, the pre-selected angle can be an angle that is between 60° and 150° (e.g. 60°, 85°, 95°, 100°, 110°, 120°, 150°, etc.).

In the folded position, the bottom portion 9*c* can be positioned to extend from the lower end portion 9*b* of the privacy screen body 9 at the pre-selected angle θ so that the bottom portion 9*c* extends along the bottom 2*c* of the work surface 2.

The bottom section 9*c* can be configured for attachment to the bottom 2*c* of the work surface via an adhesive, at least one fastener, and, or a releasable attachment mechanism (e.g. a Velcro type material that can include a plurality of hooks for releasable attachment to a plurality of loops). When a Velcro-type material is utilized as releasable attachment mechanism, at least one first strip 13 of a plurality of hooks can be on the upper side of the bottom section 9*c* when the bottom section 9*c* is in the folded position so that each first strip 13 is able to be positioned for contacting at least one corresponding second strip 14 of a plurality of loops positioned on the bottom 2*c* of the work surface. Alternatively, at least one first strip 13 of a plurality of loops can be on the upper side of the bottom section 9*c* for contacting at least one corresponding second strip 14 of a plurality of hooks on the bottom 2*c* of the work surface.

The perimeter edge 2b of the work surface can also have at least one second strip 14 attached thereto or positioned thereon. The lower end portion 9b of the privacy screen body adjacent and above the fold line 9fl can have at least one first strip 13 attached thereto or positioned thereon for contacting the corresponding second strip 14 on the perimeter edge 2b. It should be appreciated that the first strip 13 positioned above the fold line 13 and the first strip 13 positioned below the fold line 9fl on the bottom portion 9c can each be on the inner face 9i of the privacy screen body 9 for facing toward the work surface 2 when the privacy screen body 9 is attached to the work surface 2. In some embodiments, the second strip(s) 14 at the perimeter edge(s) 2b can be considered fourth strips and the first strip(s) 13 above the fold line 9fl can be considered third strips.

Figure 28:
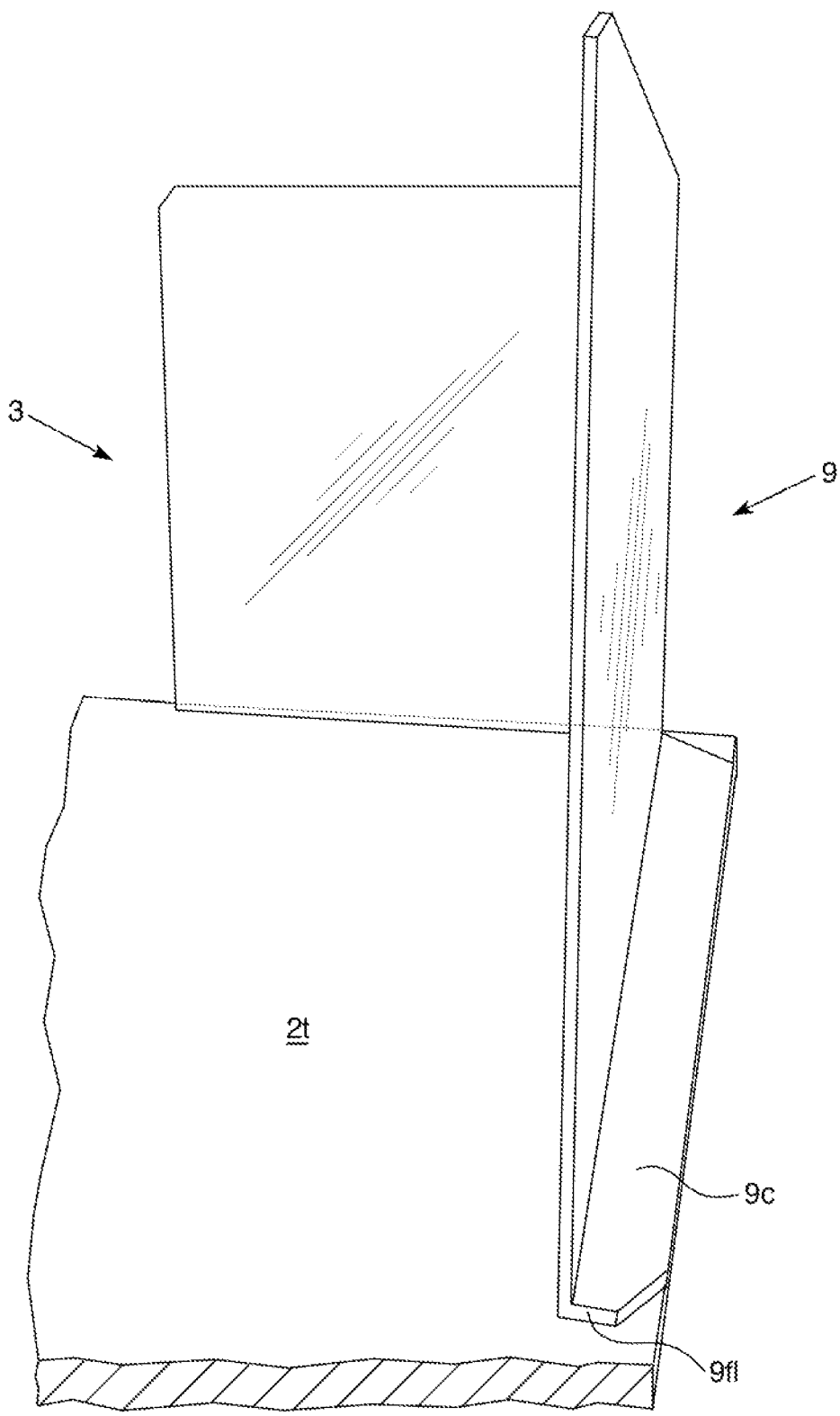
FIG. 28 is a perspective side view of an exemplary embodiment of a privacy screen and/or biohazard screen apparatus 3 on a top surface of a work surface.

In some embodiments, the screen body 9 can have a lower fold line 9fl that permits a bottom portion 9c of the body to be folded to extend away from the upper portion of the body toward a peripheral edge of a table. Such embodiments can permit the bottom portion 9c to help support the body on the top 2t of the work surface (e.g. instead of being attached at a peripheral edge of the work surface). FIG. 28 illustrates one example of such a foldable section of a screen body 9. For such embodiments, the folded bottom portion 9c can be folded and defined in the folded orientation before shipment of the body.

In other embodiments, the screen body 9 can be attached for positioning adjacent one or more perimeter edges 2b of a work surface 2 via an attachment mechanism 10 configured to be fastened via fasteners to a bottom 2c of the work surface. An example of such embodiments can be appreciated from FIGS. 12-14. For instance, as shown in FIG. 14, these embodiments of the attachment mechanism 10 can include multiple J-shaped bodies having an upper section 10b that extends form a lower portion 10c having holes 10f for fasteners (e.g. screws or bolts) to pass through the lower portion 10c for attachment of the lower portions 10c to the work surface 2. The attachment mechanism 10 can multiple arms of upper sections 10b that are spaced apart from each other to form a gap 10a sized to receive and retain a lower portion of a privacy screen body 9 therein. A bottom of a first arm of an upper section 10b of a first J-shaped body can be welded to the bottom of a second arm of an upper section 10b of a second J-shaped body to define the gap 10a. The welded or otherwise attached upper sections 10b at the bottoms of these arms can define a bottom of the gap 10a on which a bottom of the privacy screen body 9 can be positioned or in contact with. As may best be seen from the broken line image of a perimeter edge 2b in FIG. 14, the welded or otherwise joined upper sections 10b of the first and second J-shaped bodies define a joined portion 10j that can be sized in height to be equal to or about equal to a thickness of the work surface at the perimeter edge 2b along which this joined portion 10j of the attachment mechanism 10 is to be positioned. This can result in positioning the privacy screen body so it extends above the work surface 2 with no portion of the privacy screen below the top 2t of the work surface 2 or only a small section of the privacy screen body being positioned at or below the top 2t of the work surface 2 adjacent the perimeter edge(s) 2b.

In some embodiments, the elongated portion of each J-shaped body that extends above the joined portion 10j can be resiliently flexible so that when a privacy screen body is inserted into gap 10a resiliently moves away from the privacy screen body 9 to accommodate a thickness of the privacy screen body 9 and also resiliently moves into contact with the privacy screen body 9 to contact and engage the privacy screen body 9 within the gap 10a. This resilient motion of each upper section 10b of each J-shaped body can facilitate receipt and retention of the privacy screen body 9 within the gap 10a and above the joined portion 10j at a desired location adjacent the perimeter edge(s) 2b of the work surface 2.

Each J-shaped body can be composed of metal or a polymeric material. In some embodiments, each J-shaped body can be sized and configured to be a member having a J-type shape or be a sized as an L-shaped member or sized to appear like an L-shaped member.

Referring to FIGS. 15-27, it can be appreciated that embodiments of the privacy screen and/or biohazard screen apparatus 3 can be provided in a kit form so that components of the privacy screen and/or biohazard screen apparatus 3 can be included in at least one box 3bx for shipment to a work site. After the box is delivered, on-site personnel can utilize the components to quickly assemble the privacy screen and/or biohazard screen apparatus 3 on and/or adjacent the perimeter edges 2b of a work surface. An example of such a quick assembly can be appreciated from FIGS. 16-17, for example.

The components of the privacy screen and/or biohazard screen apparatus 3 included in each box 3bx can include relatively flat, thin elongated screen bodies 9. The bodies can be composed of a lightweight material such as cardboard or a clear polymeric sheet material. One or more edges of the screen bodies 9 can have a flexible strip 13fs attached thereto or provided therewith. In some embodiments, the flexible strips 13fs can be first strips 13. In other embodiments, the flexible strips 13fs can be another type of strip of material (e.g. non-Velcro type material).

In some embodiments, the flexible strips 13fs can be composed of a clear material. In other embodiments, the flexible strips 13fs can be composed of an opaque or semi-opaque material.

One side of each flexible strip 13fs at can be adhered or otherwise fastened to the screen body 9 in some embodiments while another side can be free for flexible movement to extend to the top of the work surface 2t or to another privacy screen body 9 so that the flexible strip can extend along spaced apart immediately adjacent screen bodies 9 to fill a gap 9gap between those bodies. In such a configuration, each flexible strip 13fs can be configured as a hinge that also facilitate mounting of the screen body 9 to which it is attached to a work surface 2 and/or attachment to another screen body 9 for forming the privacy screen and/or biohazard screen apparatus 3.

In other embodiments, the flexible strips 13fs can be provided as separate components within at least one box for subsequent attachment via an adhesive material or other type of fastening mechanism once the components are removed from the box 3bx.

Adhesive material 10ad can be provided in the box 3bx of the kit as well for use in assembly of the privacy screen and/or biohazard screen apparatus 3. The adhesive material 10ad can be applied for attachment of one side of each flexible strip to a work surface 2 (e.g. top of the work surface 2t or a perimeter edge of the work surface 2b). The adhesive can also be applied for attachment of each flexible strip to a screen body 9 (e.g. attachment of opposite sides of a flexible strip 13fs to different screen bodies 9 adjacent edges of those screen bodies 9 for filling gap 9gap between the screen bodies 9). In some embodiments, the adhesive 10ad can be on opposite sides of the flexible strip 13fs and be covered on each side by a removable cover that can be removed for attachment of the flexible strip to different screen bodies 9 or a screen body 9 and a work surface 2 or other structure.

In other embodiments, the adhesive material 10*ad* can be used to attach first and second strips 13 and 14 to the screen bodies 9 and the work surface 2 for attachment of the strips to the screen bodies 9 and work surfaces 2. In such embodiments, the strips can be flexible strips 13*fs* of a Velcro type material for attachment to corresponding strips while the adhesive material 10*ad* affixes the strips to the work surface 2 and/or screen bodies 9.

In some embodiments, the privacy screen and/or biohazard screen apparatus 3 may only include first and second screen bodies 9 and first, second, and third flexible strips 13*fs*. In other embodiments, the privacy screen and/or biohazard screen apparatus 3 can include more than three screen bodies 9 and more than five flexible strips 13*fs*. Kits for such embodiments may similarly utilize only a few flexible strips 13*fs* or many more flexible strips 13*fs*. In yet other embodiments discussed herein, no flexible strips 13*fs* may be utilized (e.g. the embodiments shown in FIGS. 29-33, etc.).

It should be appreciated that the kit can include at least one box 3*bx* of components. The components can include a plurality of screen bodies 9 that include a first screen body 9, a second screen body 9 and a third screen body 9. The box 3*bx* can also retain a plurality of flexible strips 13*fs*. The flexible strips can including a first flexible strip 13*fs*, a second flexible strip 13*fs*, a third flexible strip 13*fs*, a fourth flexible strip 13*fs*, and a fifth flexible strip 13*fs*. The box 3*bx* can also include additional screen bodies 9, flexible strips 13*fs*, and also adhesive material 10*ad* therein.

Figure 18:
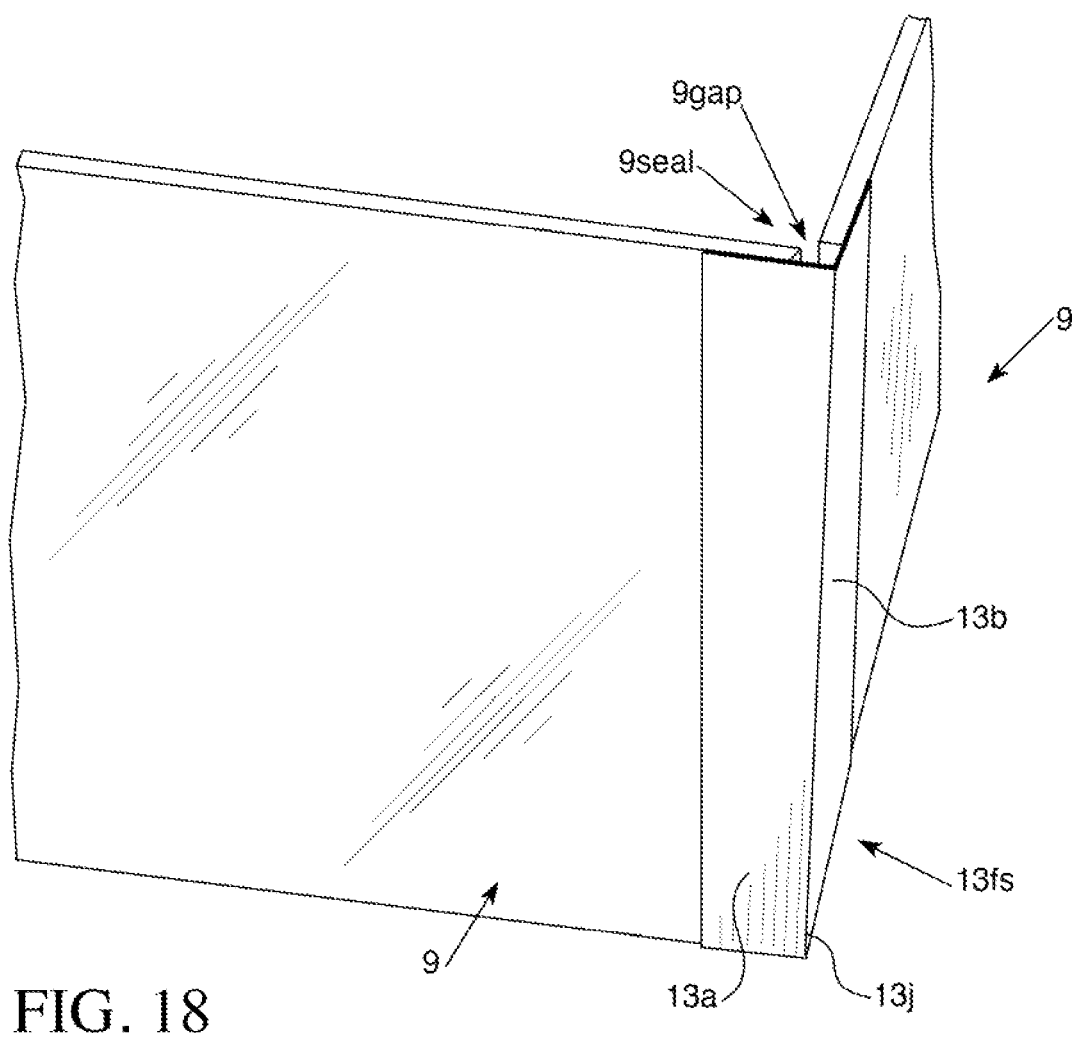
FIG. 18 is an enlarged view of an alternative corner arrangement that can be utilized in embodiments of the exemplary embodiment of the privacy screen and/or biohazard screen apparatus 3 that can be formed via the kit.

The first flexible strip can be configured to connect the first screen body to the second screen body to cover a gap 9gap defined between the immediately adjacent edges of the first and second screen bodies for forming the privacy screen and/or biohazard screen apparatus 3 for positioning on or adjacent a work surface 2. The second flexible strip can configured to connect the first screen body to the work surface, the third flexible strip configured can be configured to connect the second screen body to the work surface, and the fourth flexible strip can be configured to connect the third screen body to the work surface 2. The fifth flexible strip 13*fs* can be configured to connect the second screen body 9 to the third screen body 9 to cover a gap 9gap defined between the immediately adjacent edges of the second and third screen bodies. In addition to covering this gap, the flexible strip can form a seal 9seal for the interface between immediately adjacent screen bodies 9 that may contact each other (e.g. as shown in FIG. 18 for example) or be spaced apart from each other via a gap 9gap. Adhesive material 10*ad* or other fastening mechanism can be used to facilitate the attachment of the flexible strips 13*fs* to the work surface 2 and the privacy screen bodies 9.

The flexible strips 13*fs* included in a kit can all be the same type of can be provided in multiple configurations. For instance, some embodiments of the kit may only include a flexible strip having a first configuration such as the configuration shown in FIGS. 19-20. Other kits may only have flexible strips 13*fs* that have a second configuration such as the strips shown in FIGS. 21-24. Yet other kits can include combinations of two or more types of flexible strips (e.g. (i) a kit having strips 13 and/or 14 as well as flexible strips 13*fs* shown in FIGS. 19-20 and the flexible strips shown in FIGS. 21-24, (ii) a kit having flexible strips 13*fs* shown in FIGS. 19-20 and the flexible strips shown in FIGS. 21-24, etc.).

Figure 19:
FIG. 19 is an end view of an exemplary embodiment of a flexible strip 13*fs* that can be included in embodiments of the kit and embodiments of the privacy screen and/or biohazard screen apparatus 3.
Figure 20:
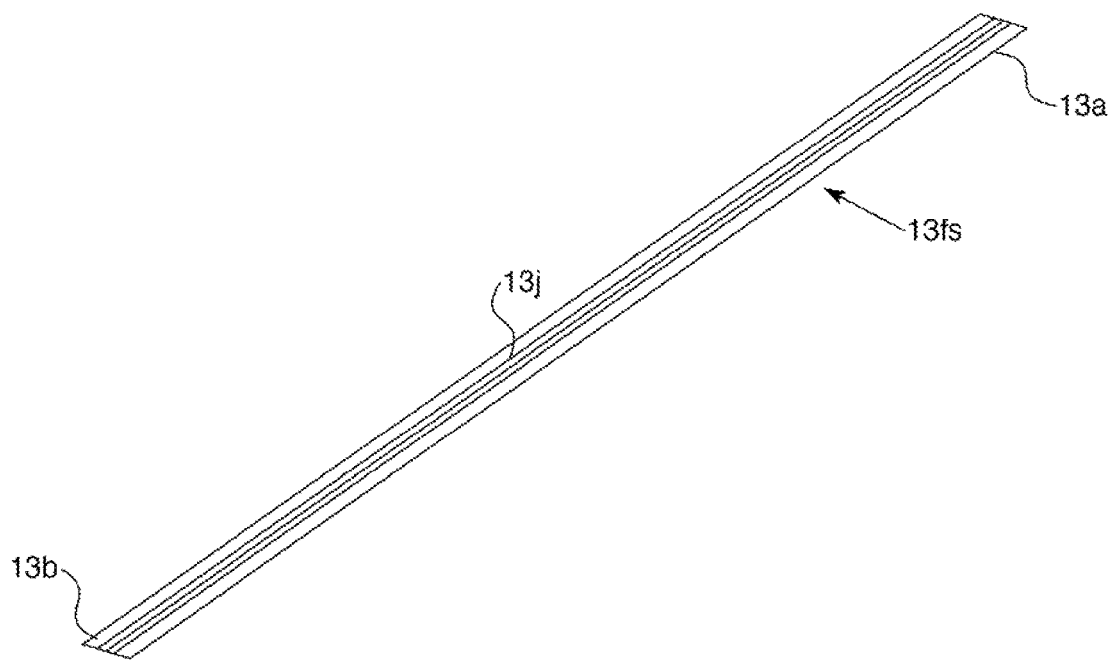
FIG. 20 is a perspective view of the exemplary embodiment of the flexible strip 13*fs* shown in FIG. 19.

Referring to FIGS. 19-20, the flexible strips 13*fs* can include a body that has a recessed region that may be thinner than its first portion 13*a* and second portion 13*b*. The recessed region 13*j* can define a joint or fold line about which the first portion 13*a* is moveable relative to the second portion 13*b* and vice versa. The recessed region 13*j* can extend along the entirety of the length of the flexible strip between its first end and its second end or can extend along a substantial portion of its length (e.g. 95% of its length, over 90% of its length, etc.). In embodiments where the flexible strip 13*fs* only has a single joint defined by a single recessed region 13*j*, the first portion 13*a* can be a first side portion and the second portion 13*b* can be a second side portion. The recessed region 13*j* can be an intermediate portion between the first and second side portions.

Figures 16, 17:
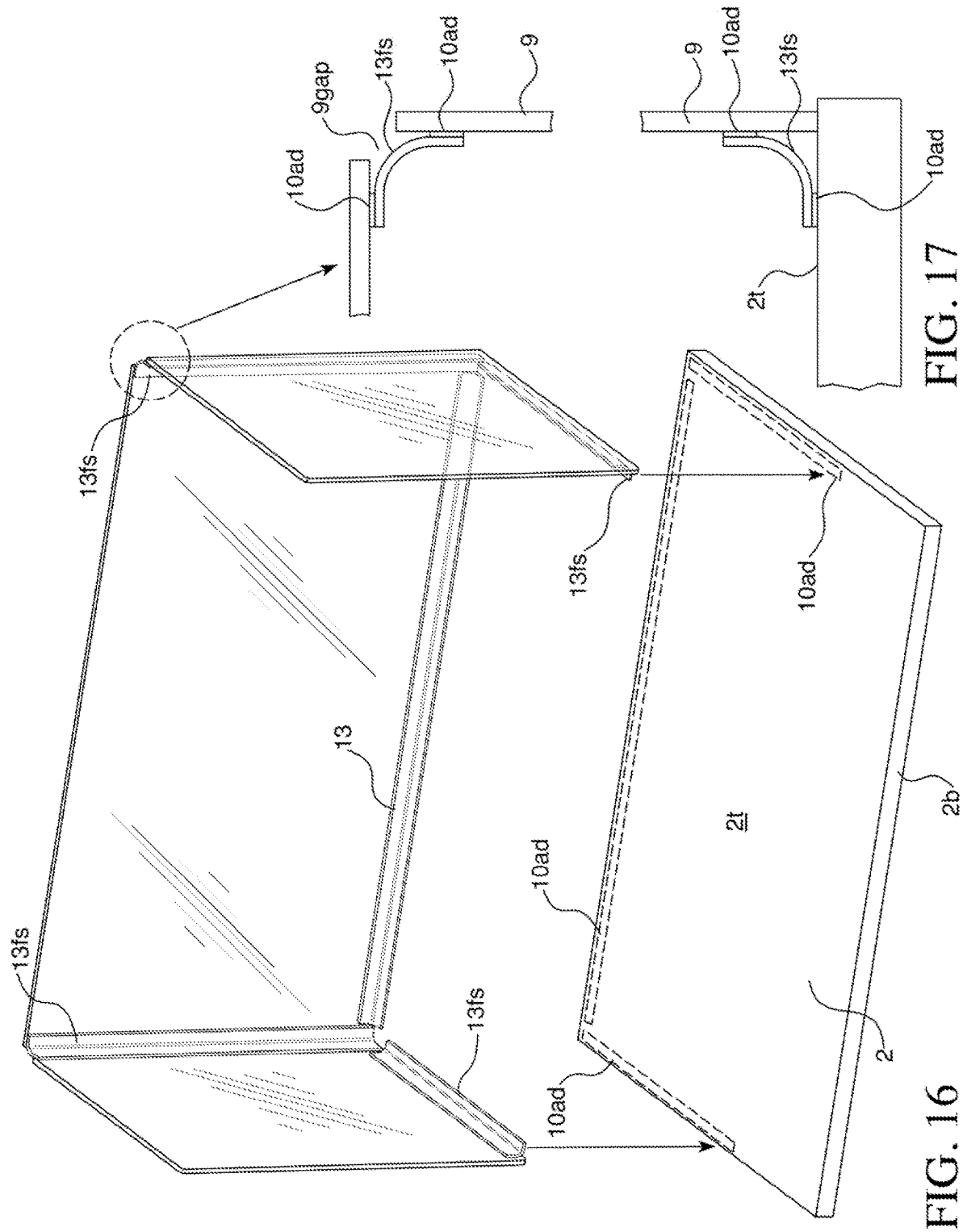
FIG. 16 is an exploded schematic view of the exemplary embodiment of the privacy screen and/or biohazard screen apparatus 3 that can be assembled from the exemplary kit illustrated in FIG. 1S. An enlarged corner detail top view of the embodiment is also provided in FIG. 16.
FIG. 17 is a fragmentary detailed side view of the exemplary embodiment of the privacy screen and/or biohazard screen apparatus 3 that is shown in FIG. 16 that can be assembled from the exemplary kit illustrated in FIG. 15.

The recessed region 13*j* can be configured to permit the first portion 13*a* and second portion 13*b* to be moved about the joint defined by the recessed region 13*j* to move the flexible strip 13*fs* from a first position in which it linearly extends (e.g. the first and second portions 13*a* and 13*b* are parallel to each other and extend at an angle of 0° or 180° relative to each other) to a second position at which the first portion 13*a* extends at an angle of 90° or at an angle between 15°-165° from the second portion 13*b* via the joint defined by the recessed region 13*j*. In some embodiments, the joint defined by the recessed region can permit the first portion 13*a* and/or second portion 13*b* to be moved so that the first portion 13*a* extends at an angle of 5°-175° from the second portion 13*b* via the joint defined by the recessed region 13*j* when the flexible strip is in its second position. FIG. 18 illustrates one example of flexible strip 13*fs* such a second position. FIG. 17 illustrates another example of the flexible strip 13*fs* in a second position.

Figure 21:
FIG. 21 is an end view of an exemplary embodiment of a flexible strip 13*fs* that can be included in embodiments of the kit and embodiments of the privacy screen and/or biohazard screen apparatus 3.
Figure 22:
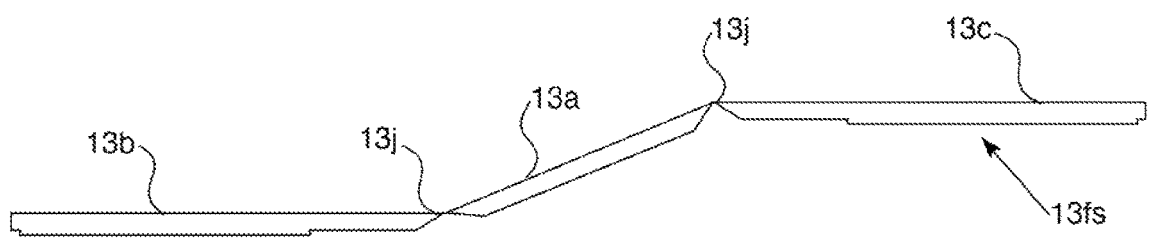
FIG. 22 is an end view similar to FIG. 21 illustrating the strip in a second position.
Figure 23:
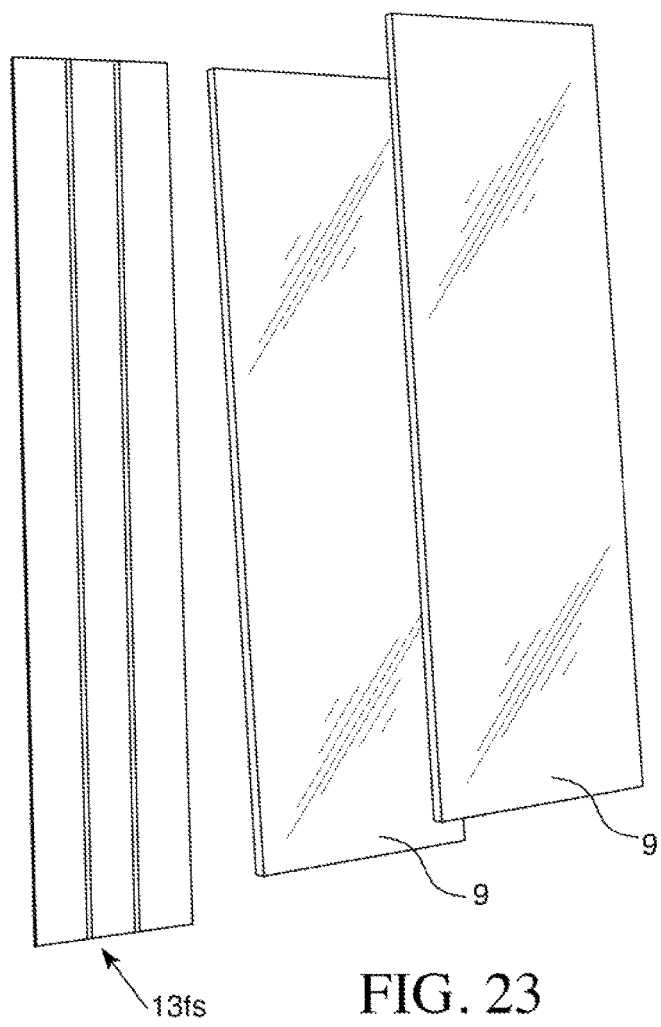
FIG. 23 is a fragmentary view of an exemplary embodiment of the kit illustrating a flexible strip 13*fs* component and multiple screen bodies 9 of the kit.
Figure 24:
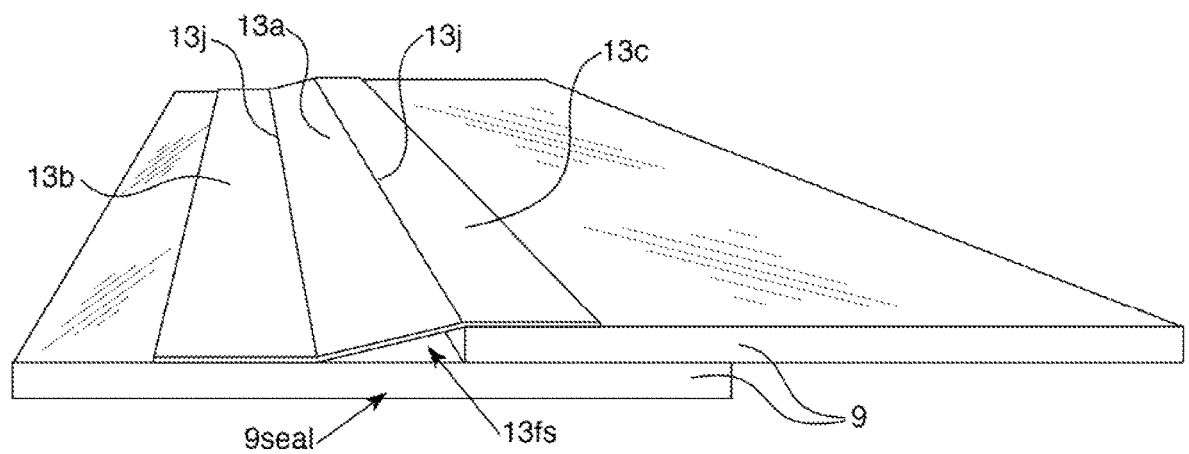
FIG. 24 is a fragmentary top view of a privacy screen and/or biohazard screen apparatus 3 illustrating an exemplary lap seal that can be formed via an exemplary embodiment of a flexible strip 3*fs* by use of the kit components illustrated in FIG. 23.
Figure 25:
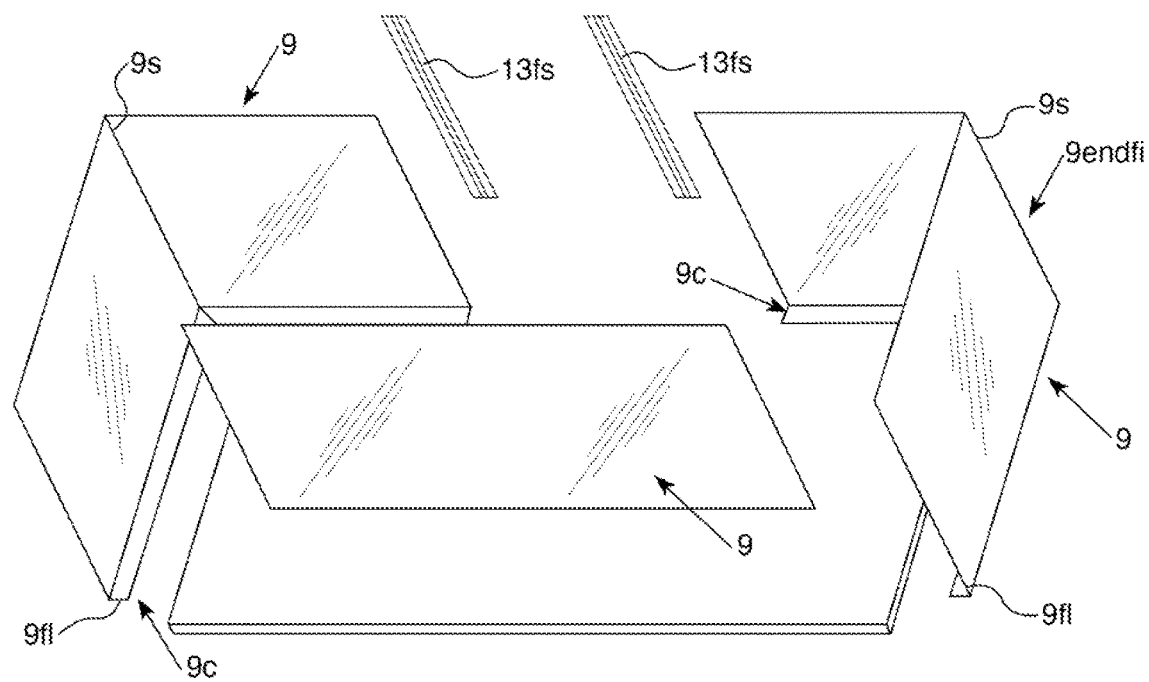
FIG. 25 is an exploded view of an exemplary privacy screen and/or biohazard screen apparatus 3 that can be formed via an exemplary embodiment of the kit.
Figure 26:
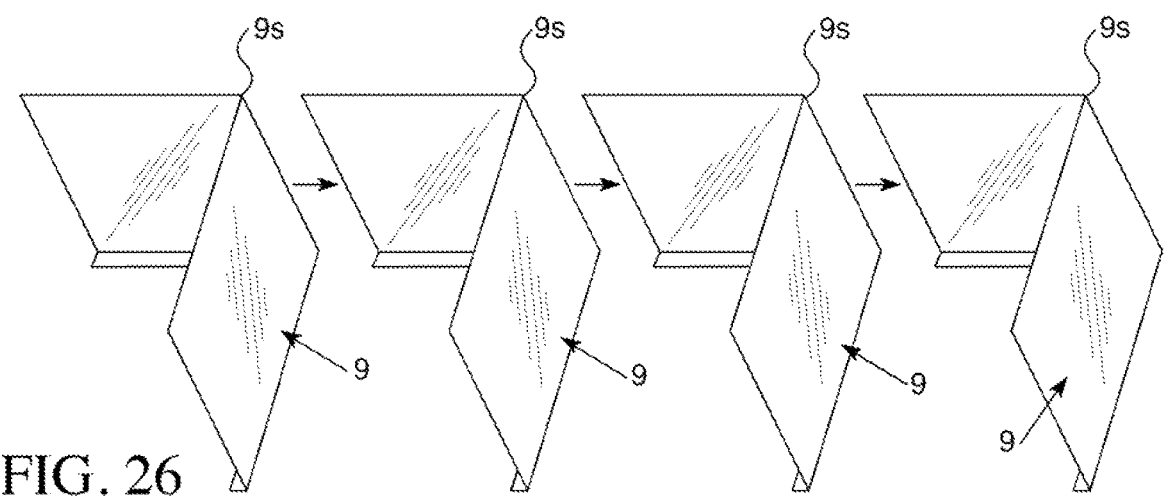
FIG. 26 is a view of exemplary screen bodies 9 that can be included in exemplary embodiments of the kit. Each of the screen bodies 9 is shown in a different folded position to illustrate examples of different folded configurations for the screen bodies 9.
Figure 27:
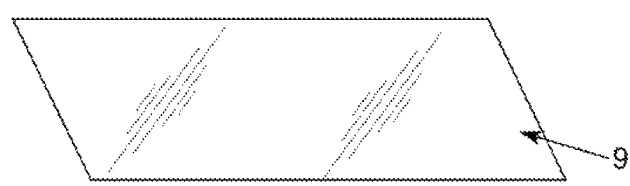
FIG. 27 is an exemplary embodiment of a screen body 9 that can be included in embodiments of the kit and embodiments of the privacy screen and/or biohazard screen apparatus 3 in a non-folded position in which the body linearly extends along an entirety of its length L (e.g. is in a non-folded position).

Referring to FIGS. 21-22, the flexible strips 13*fs* can include a body that has multiple spaced apart recessed regions 13*j* that may each be thinner than its first portion 13*a*, second portion 13*b*, and a third portion 13*c*. Each recessed region 13*j* can define a joint or fold line about which one portion 13*a* is moveable relative to an immediately adjacent portion and vice versa. For instance, the first portion 13*a* and second portion 13*b* can be moved about the first joint defined by the first recessed region 13*j* between these portions to move the flexible strip 13*fs* from a first position in which it linearly extends (e.g. the first, second, and third portions 13*a*-13*c* are parallel to each other and extend at an angle of 0° or 180° relative to each other) to a second position at which the first portion 13*a* extends at an angle of between 5°-175° from the second portion 13*b* via the joint defined by the first recessed region 13*j*. The second portion 13*b* and third portion 13*c* can be moved about the second joint defined by the second recessed region 13*j* between these portions to move the flexible strip 13*fs* from its first position to its second position at which the second portion 13*b* extends at an angle of between 5°-175° from the third portion 13*c* via the joint defined by the second recessed region 13*j*. In some embodiments, the second position of the flexible strip 13*fs* can be a configuration that orients the strip so an end view of the strip resembles an "S" or "Z" shape as can be seen from FIGS. 21 and 24, for example.

Of course, the flexible strips 13*fs* having at least one joint defined by at least one recessed region 13*j* can also be moved into other positions for other configurations via movement about each joint. It should therefore be appreciated that the flexible strips 13*fs* can be moved into multiple other positions (e.g. a third position, a fourth position, etc.) as well as being moved between first and second positions.

As can be seen from the drawings (e.g. FIGS. 1-2, 6-7, 10-12, 16, 18, and 25), embodiments of a kit can be configured so that components are easily and compactly shippable for formation of one more privacy screen and/or biohazard screen apparatuses 3. As may be seen from FIGS. 25-27, the screen bodies 9 included in the kit can include multiple different sized bodies 9. For instance, there can be multiple foldable bodies 9 or multiple folded bodies 9 in addition to multiple bodies 9 that are sized to extend linearly along their length and not be foldable or not have to be folded for formation of an apparatus 3. For example, as can be appreciated from FIG. 26, a kit can include one or more bodies 9 that are able to be folded about at least one foldable section 9s (e.g a vertically extendable fold line 9s defined therein that functions similarly to horizontally extending fold line 9fl discussed herein). One or more bodies 9 (or all the bodies 9 in a kit) may only have a single fold line extending vertically along the height of the body 9. Other embodiments may utilize at least one body (or all the bodies) that have multiple different spaced apart fold lines extending vertically along the height of the body 9 so that those bodies can be folded into different configurations. Such folding options can permit the same body to be moved into a folded position to cover table corners of different sizes/dimensions.

Additionally, some bodies 9 may be configured so they are linearly extending/planar in shape (e.g. only rectangular or oval in shape with no fold/angle segments). For instance, as can be seen from the exemplary embodiment of FIG. 25 and from FIG. 27, at least one screen body 9 can be an intermediate screen body that is to be positioned between bodies 9 that may each be folded about a fold line 9s so the body extend along two sides and a corner of a work surface 2. These foldable end screen bodies can also include at least one horizontal fold line 9fl for facilitating screen body mounting (see e.g. FIGS. 8-11). Each intermediate body 9 can be connected to adjacent bodies 9 via flexible strips 9fs. For instance, a first side of a first intermediate body 9 can be attached to a first side of a first end screen body 9 via a first flexible strip 13fs and a second side of a first intermediate body 9 can be attached to a first side of a second end screen body 9 via a second flexible strip 13fs.

In other arrangements, a first intermediate portion of the first intermediate body that is positioned inward of the first end of the intermediate body 9 can be attached to the first side of a first end screen body 9 via a first flexible strip 13fs. A second intermediate portion of the first intermediate body 9 that is inward of the second end of the intermediate body 9 and is located between the second end and the first intermediate portion of the first intermediate body can be attached to a first side of a second end screen body 9 via a second flexible strip 13fs. Such connections to intermediate portions of the intermediate body 9 can result in the first and second end portions of the intermediate body being in an overlapping arrangement with the first and second end screen bodies 9 (e.g. the first end may overlap a portion of the first side of the first end screen body and the second end may overlap a portion of the second side of the second end screen body). In yet other arrangements, only one end of an intermediate body may significantly overlap with one of the end screen bodies while the opposite end of the intermediate body is attached to a side of the other end screen body.

The connections provided by the flexible strips 13fs can provide seals 9seal between the intermediate screen body 9 and the end screen bodies 9 to help provide a screen that helps more fully enclose a work surface 2. The connections can also cover gaps 9gap that can be present between the sides of the intermediate screen body 9 and the end screen bodies 9. Such an arrangement can help better protect a worker working at the work surface from a biohazard that may be passed from other coworkers at other work stations (e.g. germs that may be airborne via coughing, etc.).

In other embodiments, the end screen bodies 9 can be two separate bodies 9 instead of a single foldable body 9. In such embodiments, the end screen bodies 9 can include a first side screen body 9end that is connected to a second side screen body 9 via a flexible strip 13fs to cover a gap 9gap at the immediately adjacent sides of these bodies similar to the connection shown in FIG. 18, for example.

We have determined that the use of an intermediate body 9 can help permit a single box having a kit of many components to permit installation of different sized and shaped privacy screen and/or biohazard screen apparatus 3. For instance, intermediate bodies 9 can be used to help cover longer peripheral edges of longer work surfaces 2 while such bodies may not be needed for shorter sized work surfaces 2. The inclusion of at least some intermediate bodies 9 in a kit can permit a kit to be shipped for forming privacy screen and/or biohazard screen apparatus 3 on different tables, desks, or counters of different lengths and widths without requiring use of a many different kit types for a particular customer. The inclusion of the intermediate bodies along with other screen bodies 9 that are foldable into one or more angled arrangements helps provide even further flexibility for a single embodiment of the kit to meet a number of different customer needs even though those customers may have drastically different needs to account for their drastically different inventory of counters, desks, tables, and other work stations having different work surface shape and sizes. This type of significant improvement can allow kits to be quickly made and shipped to allow a single kit embodiment to meet the needs of many different work surface sizes and arrangements a customer may have. This can result in a manufacturer being able to have a single SKU or a small number of SKUs for meeting the needs of a large number of different customers having drastically different needs. This can be particularly advantageous for embodiments that utilize low cost and lightweight materials for screen bodies (e.g. cardboard, corrugated cardboard, acrylic, plexiglass, or corrugated plastic bodies, etc.) as the shipping costs for such kits are relatively low even if some components of the kit may not be needed by a particular customer as that slight added cost in shipping can be offset by other benefits provide by the use of single kit type or limited set of kit types for meeting customer needs.

Further, we have determined that the intermediate screen body 9 being positionable for overlapping with at least one other side screen body or end screen body can provide a significant adjustability value that offsets the losses in cost associated with excess material that may be in an overlapping position with one or more other screen bodies of a privacy screen and/or biohazard screen apparatus 3. In particular, the ability of an intermediate screen body to account for a large range of possible work surface lengths can allow a kit for at least one privacy screen and/or biohazard screen apparatus 3 to be provided for use in connection with a large array of different work surface dimensions. Such flexibility is further enhanced by providing end screen bodies 9 that are foldable into different angled arrangements to account for different dimensions of different work surfaces. We have determined that the improved adjustability of a single kit type or a relatively small number of kit types (e.g. one, two, or three kit SKUs), to meet the needs for providing biohazard protection for a large array of possible work surface dimensions can be significant enough to offset the increased costs associated with having some material of the intermediate body 9 in overlapping position with respect to one or more end screen bodies 9.

In some embodiments, a single kit can be configured so that the kit can be used to install a privacy screen and/or biohazard screen apparatus 3 for the work surface dimensions in which a depth is 30 inches (76.2 cm) and a length (or width) of 90-48 inches (228.6 cm-121.92 cm) and also for work surfaces having a depth of 24 inches (60.96 cm) and a length (or width) of 40-104 inches (101.6 cm-264.16 cm). For example, a single kit can provide at least one privacy screen and/or biohazard screen apparatus 3 for a work surface having any of the following dimensions (length by depth, with "inches" being referred to as ""): 48"×30", 63"×30", 90"×30", 60"×24", 75"×24", and 104"×24".

In some embodiments of the kit, each end screen body 9 can have a fixed bend (e.g. a fixed "L" type configuration for enclosing a corner area adjacent an end of a work surface 2 in which a first portion 9a can extend at an angle relative to a second portion (e.g. an angle of 90° or 80°-100°, etc.). Such a screen body 9 can be stacked within a box with other L-shaped screen bodies in a nested manner on one or more linearly extending, flat intermediate screen bodies (e.g. on top of such intermediate screen bodies or at a side of such bodies, etc.). Such L-shaped end screen bodies can be configured so that a shorter portion can extend along a 24" depth of an end of a work surface while the longer portion extends along the length of a side of the work surface extending between the opposite ends of the work surface 2. This same end screen body can also be positioned so that its longer portion can extend along a 30" depth at an end of a work surface while the shorter portion extends along a portion of the length of the work surface at a side of the work surface that extends between the opposite ends of the work surface. The intermediate body 9 included in the kit can then be positioned between opposite sides of the end screen bodies along a portion of the length of a peripheral edge for work surfaces longer than 48" (that have a 30" depth) or longer than 60" (for work surfaces having a 24" depth).

Other kits having L-shaped end screen bodies can be configured for other types of width and length work surface combinations as well. For instance, L-shaped end screen bodies can be configured so that a shorter portion can extend along an end of a work surface having a 23" depth while the longer portion extends along a portion of an edge of the work surface along the length of the work surface at a side of the work surface extending between the ends of the work surface. This same end screen body can also be positioned so that its longer portion can extend along a 29" depth at an end of a work surface while the shorter portion extends along a portion of the length of the work surface at a side of the work surface extending between the opposite ends of the work surface. The intermediate body 9 can then be positioned between opposite sides of the end screen bodies along a portion of the length of a peripheral edge for work surfaces longer than 48" (that have a 30" depth) or longer than 60" (for work surfaces having a 24" depth).

Referring to FIGS. 29-31, a privacy screen and/or biohazard screen apparatus 3 can include privacy screen bodies that can be sized and configured as triangular cross sectional shape screen bodies 19 that can define at least one inner channel 19c therein that is triangular in shape. The triangular shaped inner channel 19c can be sized to permit an intermediate triangular shaped screen body 23 to be telescopingly positioned within the inner channel 19c as shown in FIGS. 30-31, for example. The intermediate triangular shaped screen body 23 may be slightly smaller in height and width than the triangular cross sectional shape screen bodies 19 for being moveably positioned within the inner channel 19c so that at least a portion of the intermediate triangular shaped screen body 23 can extend out of the inner channel 19c while another portion of the intermediate triangular shaped screen body 23 is within the inner channel 19c (e.g. a first end may be positioned outside of the inner channel 19c while a second end is within the inner channel 19c).

In some embodiments, the triangular cross sectional shape screen bodies 19 can have a first side portion 19a that extends at an angle relative to a second side portion 19b via a defined fold segment 19s. The bodies can be structured so that this fold segment is a permanent segment so that the first and second side portions 19a and 19b are not moveable or the fold segment 19s can be configured as a resilient segment between the first and second side portions 19a and 19b to permit the first side portion 19a to move relative to the second side portion 19b (and vice versa) via the intermediately positioned fold segment 19s. Such a configuration can permit the triangular cross sectional shape screen bodies 19 to be positioned on a top of a work surface 2 near a peripheral edges of the work surface and a corner at which peripheral edges may meet or contact each other. The intermediate triangular shaped screen body 23 can be configured to extend along a portion of a length of one peripheral edge of a work surface 2. For instance, a first end of an intermediate triangular shaped screen body 23 can be within an inner channel 19c of a first triangular shaped screen body 19 positioned at a first end of a work surface to an inner channel 19c of a second triangular shaped screen body 19 positioned at a second end of a work surface as shown in FIG. 30, for example.

In other embodiments, intermediate triangular shaped screen body 23 may not be used or may be entirely retained within the inner channels 19c of two different triangular shaped screen bodies 19 (e.g. no portion of the intermediate triangular shaped screen body 23 may be outside of the inner channels 19c), as shown in FIG. 29, for example. Such use may be helpful when a work surface is not particularly long and the triangular shaped screen bodies 19 are able to extend to provide protection at peripheral edges and corners without need for the intermediate triangular shaped screen body 23 to extend along a length of a segment of a peripheral edge to provide additional protection.

Figure 33:
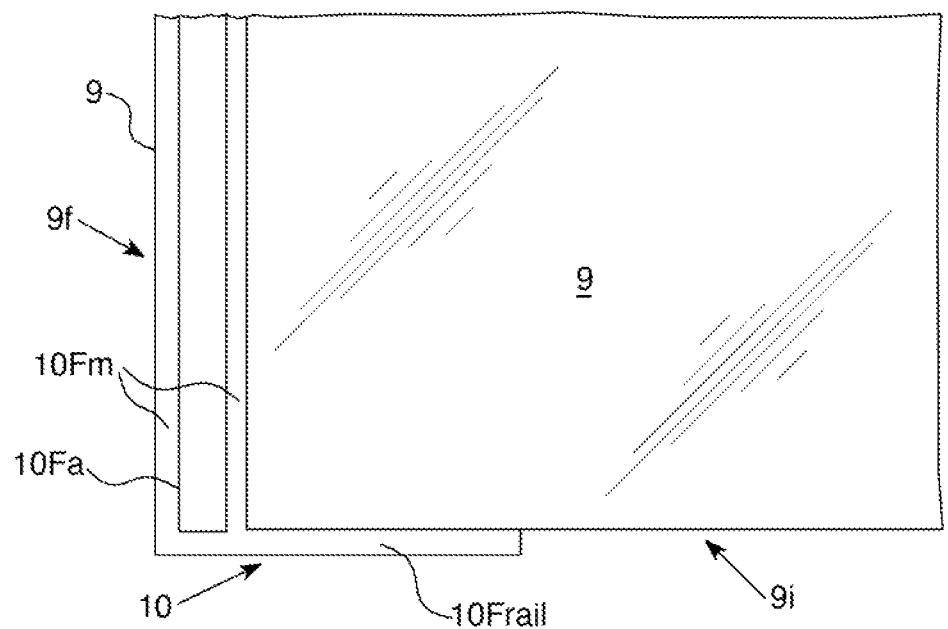
FIG. 33 is cross-sectional view illustrating an exemplary screen attachment mechanism of the privacy screen and/or biohazard screen apparatus shown in FIG. 32.

Referring to FIGS. 32-33, embodiments of the privacy screen and/or biohazard screen apparatus can include an attachment mechanism 10 that utilizes a rail body 10Frail having an "F" shaped profile for retaining of screen bodies 9 and positioning those screen bodies on a work surface 2 adjacent peripheral edges of the work surface 2. The "F" shaped profile of the rail body 10Frail includes spaced apart first and second members 10Fm that extend from the rail body 10Frail to define a gap 10Fa for retaining a portion of a screen body 9. A second screen body 9 can be positioned to abut a second innermost member 10Fm and also contact the rail body 10Frail for being positioned next to the screen body 9 within the gap 10Fa for forming a corner that is covered by the rail body 10Frail, which extends from the outermost member 10FM to a position away from the innermost member 10Fm. The screen bodies 9 can be configured to rest on a top of the work surface or be attached to the top of the work surface and/or peripheral edge of the work surface (e.g. via adhesive, stand members, etc.). The rail body 10Frail having an "F" shaped profile can be attached to the bottom 2c of the work surface or the top 2t of the work surface 2 for positioning of the privacy screen body 9 adjacent an edge 2b of the work surface and attachment of the privacy screen to the work surface 2.

In yet other embodiments, the attachment mechanism 10 can include at least one attachment member 10u that has a channel defined therein. The attachment member 10u can have a U-shaped cross-sectional shape or a generally U-shaped cross-sectional shape that defines the screen body receiving channel of the attachment member 10u.

The channel of the attachment member 10u can be in communication with an open top slot through which a bottom portion of a screen body is positionable for an interference fit connection within the U-shaped cannel of the attachment member 10u. A bottom and sidewalls of the attachment member 10u can define the shape of the top slot or mouth that is in communication with the channel defined within the attachment member 10u.

Each attachment member 10u can be attached to the top 2t of a work surface 2 via one or more fastening mechanisms. One such mechanism can include double sided tape. The tape can be configured to have a bonding strength that is sufficient to hold the attachment member 10u for supporting the screen body therein while also permitting the tape to be removed from the top 2t of the work surface without marring or damaging a finish of the top of the work surface (e.g. a laminated top layer of the top 2t, etc.). Other examples of such fastening mechanisms can include fasteners or other types of adhesive material.

Figure 41:
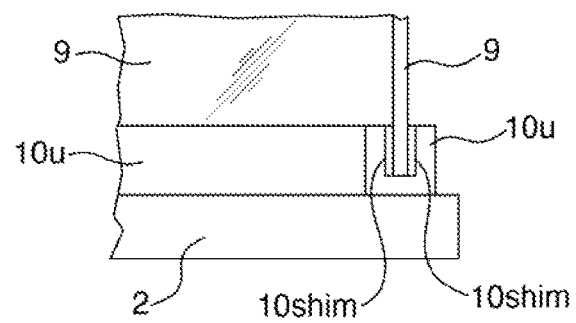
FIG. 41 is a fragmentary detail side view of the exemplary embodiment of the privacy screen and/or biohazard screen apparatus 3 that is shown in FIG. 40 that can be assembled from the exemplary kit. This side view illustrates shim members 10 shim that can be utilized in embodiments of the kit and embodiments of the privacy screen and/or biohazard screen apparatus 3.

As may best be seen in FIG. 41, one or more shims 10shim can be positioned in the channel of the attachment member 10u to help provide a tight interference fit of the screen body within the channel of the attachment member. Each shim 10shim can be positioned so it is between a face of the screen body and a sidewall of the attachment member that defines a side of the channel. Each shim 10shim can directly contact the face or side of the screen body and the sidewall to help ensure a sufficient interference fit connection between the attachment member 10u and the screen body 9 to support the screen body on the top 2t of the work surface for a stable positioning of the screen body 9. For example, there can be at least one first shim positioned between an inner face 9i of the screen body 9 and a first sidewall of the attachment member 10u and at least one second shim 10shim can be positioned between the outer face 9f of the screen body 9 and a second sidewall of the attachment member 10u. The positioning of the shim members 10shim can permit the shims to engage and/or contact the screen body 9 and the attachment member 10u to facilitate a sufficiently tight interference fit connection between the screen body 9 and the attachment member 10u.

Figure 34:
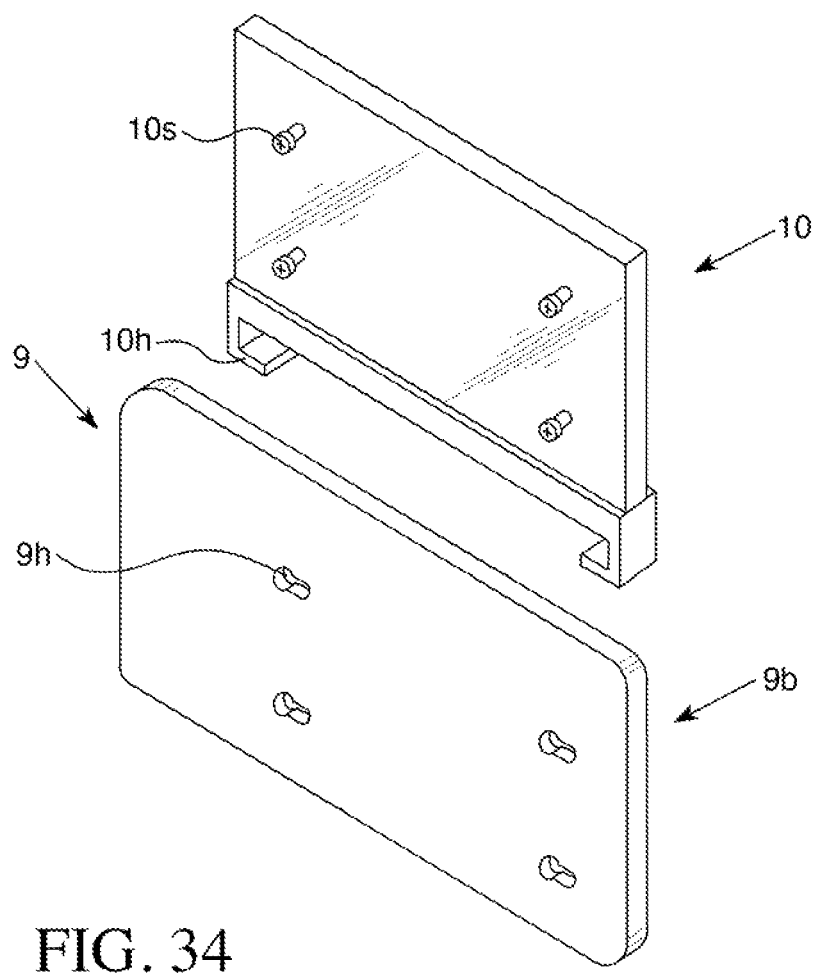
FIG. 34 is a schematic exploded view of an exemplary screen body attachment mechanism 10 that can be utilized in embodiments of the kit and embodiments of the privacy screen and/or biohazard screen apparatus 3.
Figure 35:
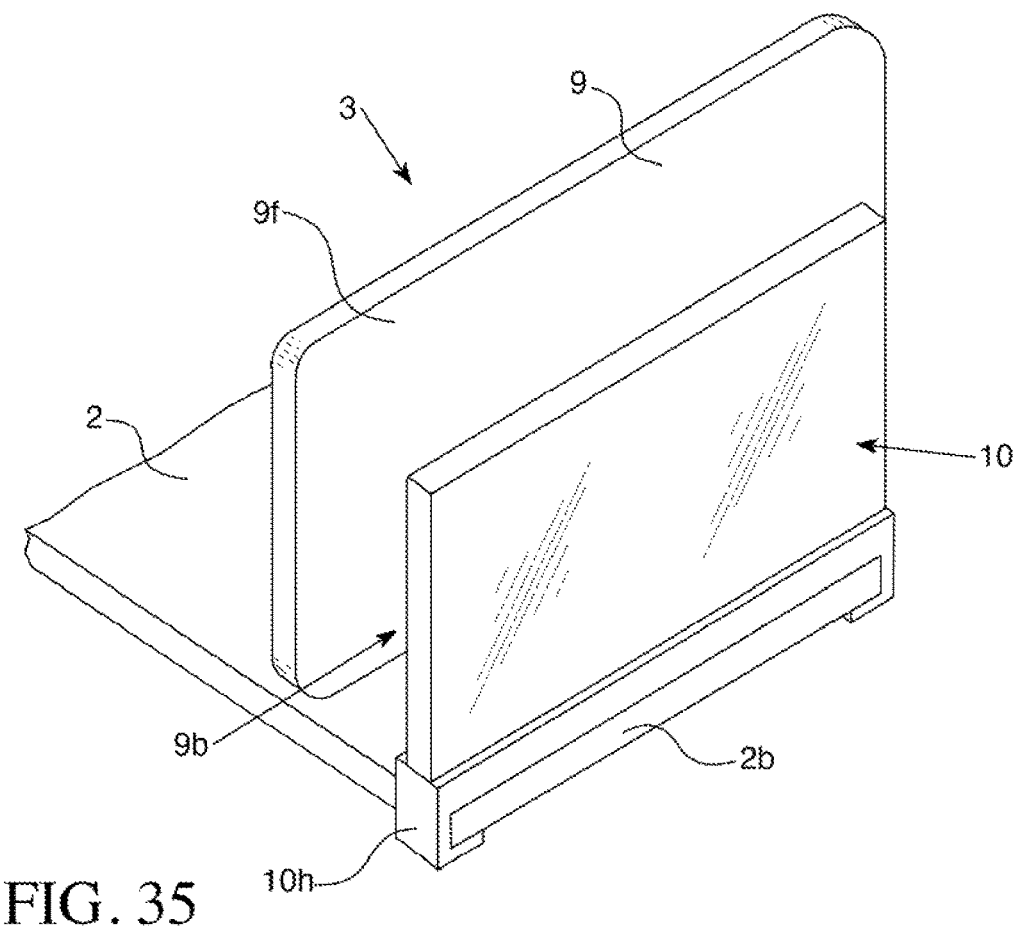
FIG. 35 is a schematic view of an exemplary embodiment of the privacy screen and/or biohazard screen apparatus 3 using the attachment mechanism 10 shown in FIG. 35.
Figure 36:
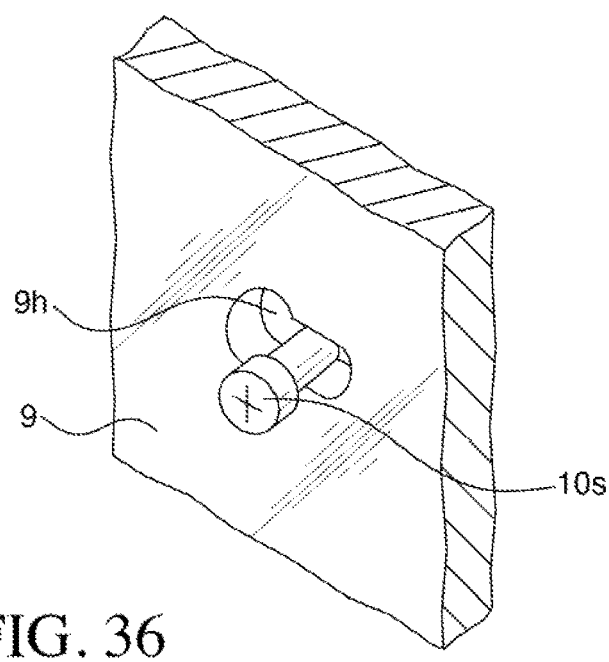
FIG. 36 is a fragmentary view of the embodiment shown in FIG. 35 that illustrates the exemplary attachment of the screen body 9 to the attachment mechanism 10.

Referring to FIG. 34-36, another embodiment of the privacy screen and/or biohazard screen apparatus 3 can utilize an attachment mechanism 10 that includes hook members 10h that are spaced apart from each other to retain peripheral edge portions of a work surface for attachment of a screen body 9 to the work surface 2. The body of the attachment mechanism attached to the hook members 10h can have one or more projections 10s that extend from the body to a distal end of the projection. Each projection 10s can be a screw, a bolt or other type of projection member that extends from the body of the attachment mechanism at a location that is above the hook members 10h. In some embodiments, each projection member can be passed further into the body and also moved further out of the body (e.g. via rotation of the screw or bolt, etc.) to facilitate attachment of a screen body 9 to the body of the attachment mechanism above the hook members 10h.

Each screen body 9 can have a lower portion 9b that has one or more holes 9h. Each hole 9h can have a larger dimensioned opening in communication with a smaller dimensioned opening to define a keyhole slot type hole. A distal end of a projection member 10s can be passed through the larger opening and an intermediate portion of the projection member 10s that extends from the distal end toward the attachment mechanism body can be positioned in the larger opening of the hole 9h and moved from the larger opening to the smaller opening for locking the screen body 9 onto the attachment mechanism body via the projection member(s) 10h. For projection members 10h that can be passed further into the body of the attachment mechanism, the projection members 10h can be rotated or otherwise moved to tighten the position of the distal end of the projection member 10s on inner face 9i of the screen body via movement of the distal end of the projection member 10s closer to the attachment mechanism body so that the outer face 9f of the screen body 9 is moved closer to and/or in contact with the body of the attachment mechanism 10.

The screen body 9 can be removed from the attachment mechanism for repositioning or other use by loosening the projection member 10s (e.g., having the distal end of the projection member 10s moved farther away from the screen body 9 and attachment mechanism body) and then positioning the projection member 10s from the smaller opening of the hole 9h into the larger opening of the hole 9h for removal of the screen body 9 from the body of the attachment mechanism 10. A new screen body 9 can then be attached to the attachment mechanism 10 if necessary or desired in a similar manner to the original screen body 9.

In some embodiments, the attachment mechanism 10 can be configured as a pre-existing screen that has fasteners positioned therein. An additional screen body 9 can then be attached via the holes 9h as discussed herein with respect to the embodiments of FIGS. 34-36 to provide an enlarged screen body for greater protection that may be desired for a particular work area. Such an increase in size of the screened work surface can help provide a biohazard protection feature that the pre-existing screen may not have been able to provide. This approach can also permit the enlarged screen body 9 to be attached quickly and easily for easy retrofitting and adjustment of the screen to form the apparatus 3.

Moreover, embodiments of such a kit can provide a lightweight, larger screen body 9 for quick and easy installation to pre-existing screens (as the attachment mechanism 10) already attached to a work surface 2 to provide an improvement in biohazard protection via attachment of the larger lightweight screen body 9 to the already installed screen body. Such a kit can include fasteners (e.g. screws, bolts, nails, etc.) and screen bodies 9 having holes 9h in their lower portions 9b. The screen bodies 9 can be comprised of a lightweight material (e.g. polymeric material, PET, cardboard, corrugated plastic material, etc.). Flexible strips 13fs can also be provided in some embodiments of such a kit to facilitate attachment of immediately adjacent screen bodies 9 (e.g. at corners of a work surface etc.) to help further facilitate improved biohazard protection by sealing or filling gaps between adjacent screen bodies 9. Additionally, some embodiments can also include adhesive material to help facilitate attachment of the flexible strips 13fs to the larger screen bodies 9 (where screws or other fastening mechanism may not be desired to be used).

It should be appreciated that different components of a privacy screen and/or biohazard screen apparatus 3 or embodiments of a kit for such an apparatus can be modified to meet a particular set of design criteria. For instance, the size and shape of the privacy screen and/or biohazard screen apparatus 3 can be configured for positioning adjacent to different types of work surfaces having different shapes or sizes. For instance, the height at which each screen body 9 extends above the work surface 2 at peripheral edge(s) of the work surface can be sized to meet a particular design objective to help provide biohazard protection as well (e.g. extend 2-4 feet above the top surface 2s of the work surface 2, extend at least 18 inches above the work surface, etc.).

Figure 37:
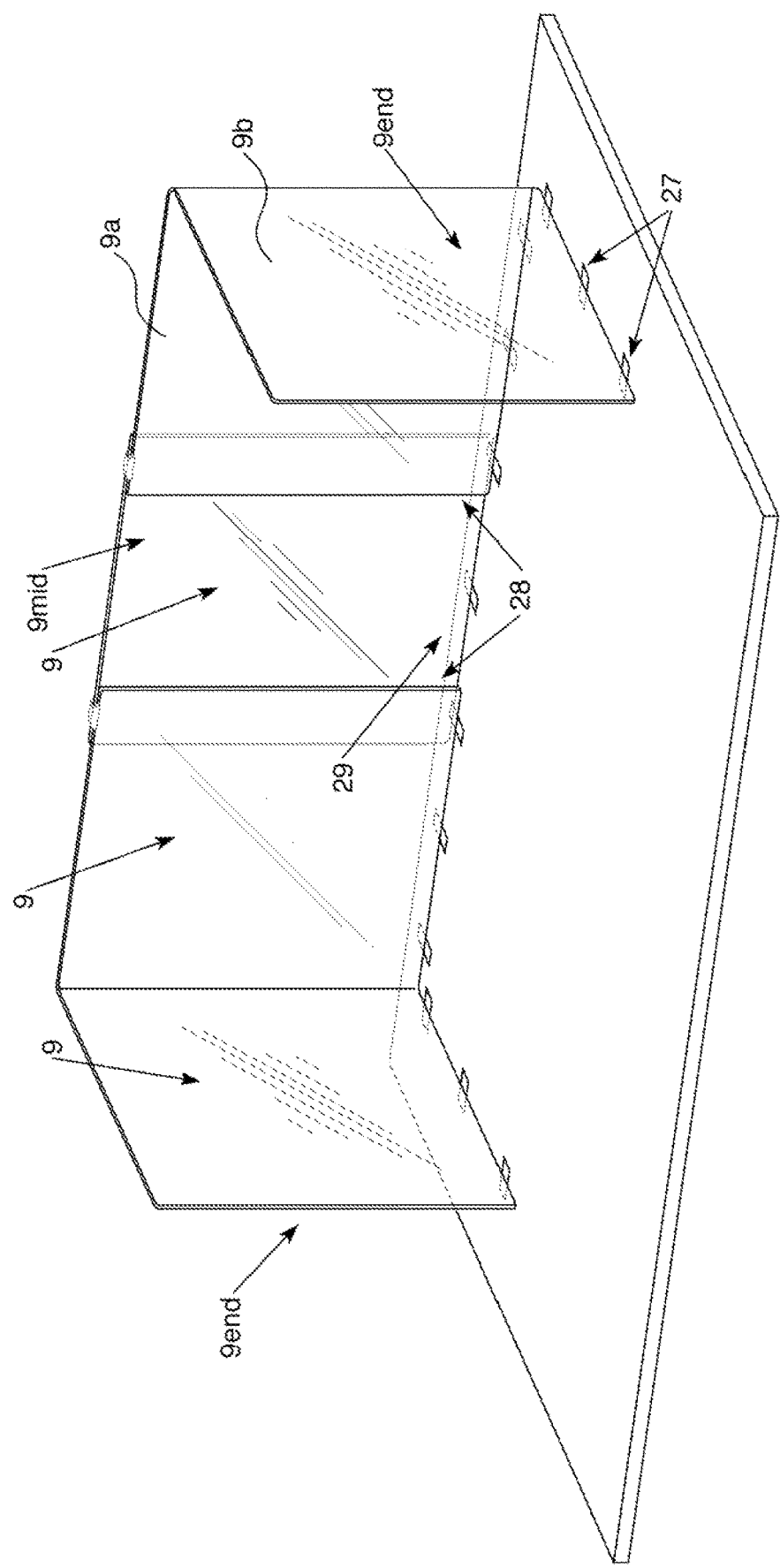
FIG. 37 is a perspective view of an exemplary embodiment of a privacy screen and/or biohazard screen apparatus 3.
Figure 38:
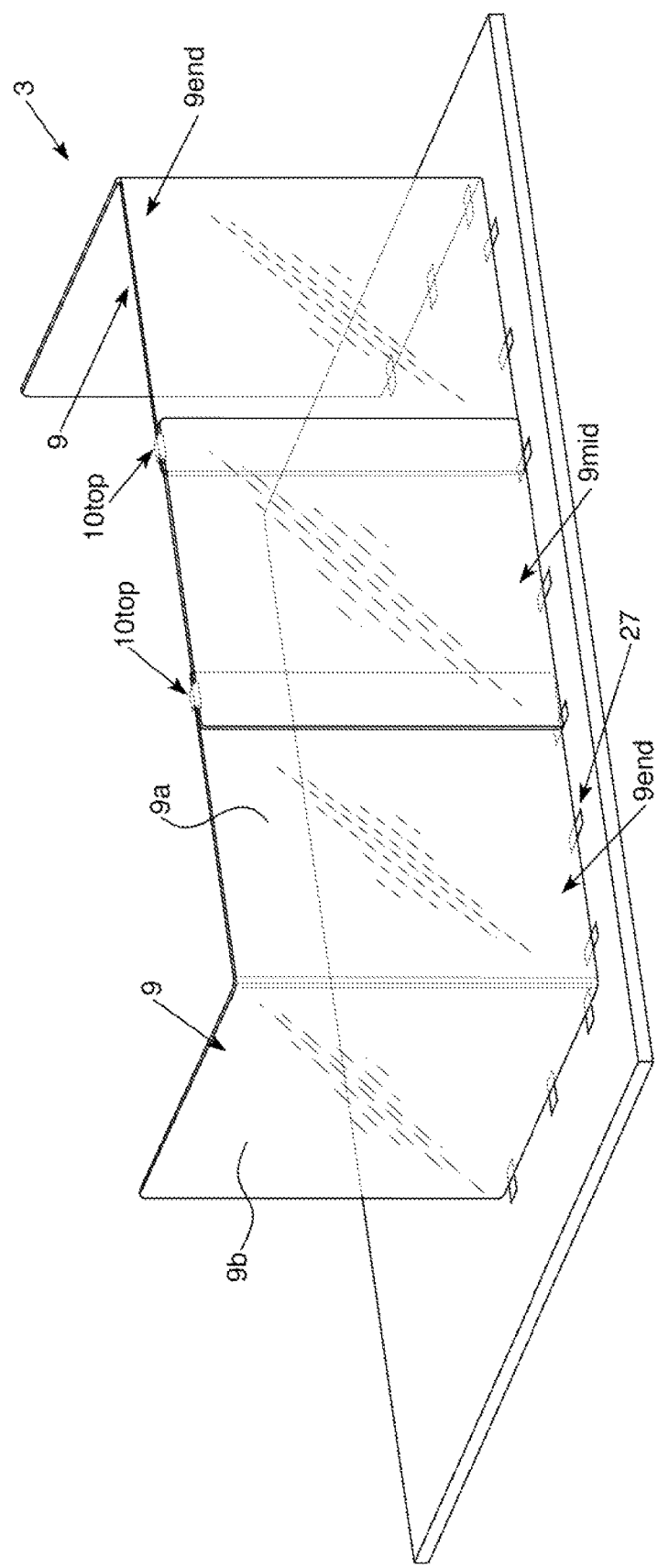
FIG. 38 is another perspective view of the exemplary embodiment of the privacy screen and/or biohazard screen apparatus 3 shown in FIG. 37.
Figure 39:
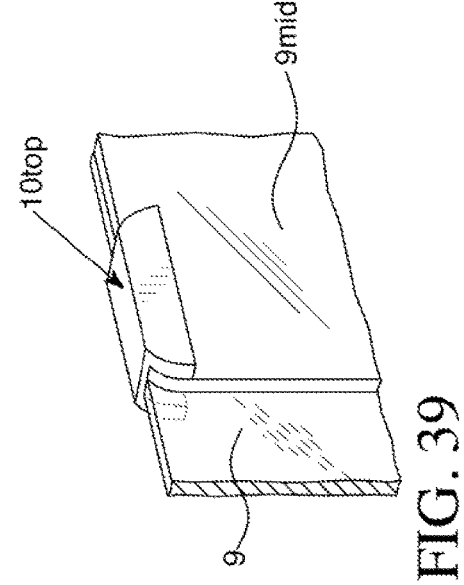
FIG. 39 is an enlarged fragmentary view of the apparatus shown in FIGS. 37 and 38 to illustrate an exemplary upper screen body attachment mechanism 10 top utilized in this embodiment of the privacy screen and/or biohazard screen apparatus 3.
Figure 40:
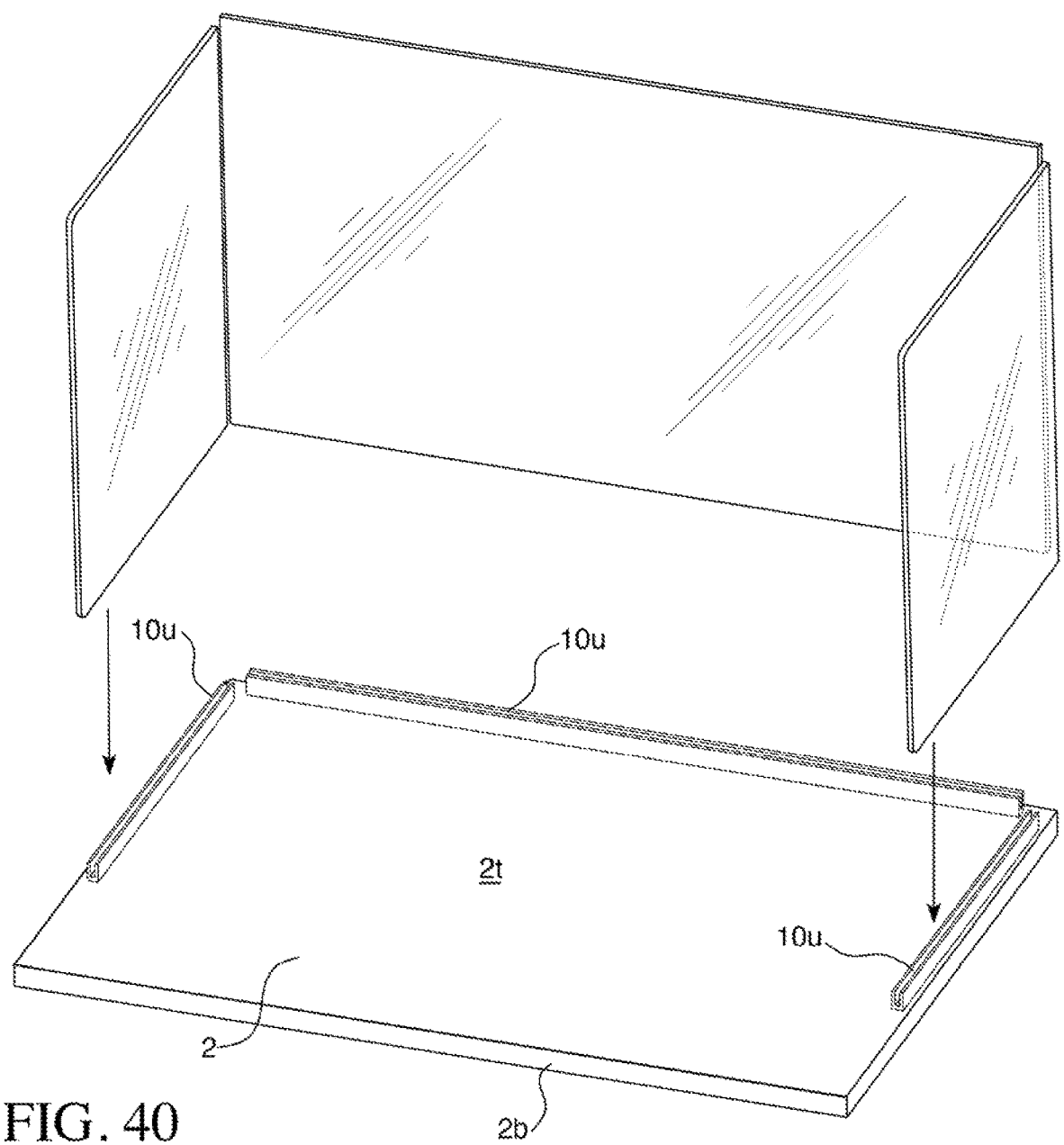
FIG. 40 is an exploded schematic view of the exemplary embodiment of the privacy screen and/or biohazard screen apparatus 3 that can be assembled from the exemplary kit that can include U-shaped members 10*u*.

Referring to FIGS. 37-39, another embodiment of the privacy screen and/or biohazard screen apparatus 3 can include screen bodies 9 and an intermediate screen body 9mid each composed of a clear lightweight material such as acrylic material or Plexiglas material. Each of the bodies can be attached to stands 27 at their bottom ends for supporting the screen bodies on the top of a work surface 2. Each end screen body 9endfi can be attached to a respective end of the intermediate screen body 9mid via a top attachment mechanism 10top that can be configured to clip the intermediate screen body 9mid to the end screen bodies 9. Each end screen body 9endfi can include a first portion 9a that extend at an angle away form a second portion 9b for being positioned adjacent to a corner of a work surface 2 at which two peripheral edges may meet. A first inner side 28 of the first end screen body 9 can be spaced apparat from a first inner side 28 of the second end screen body 9 to define a gap 29. The intermediate screen body 9mid can be positioned adjacent the first inner sides 28 of the end screen bodies 9endfi to cover the gap 29 to extend the biohazard protection provided by the apparatus across the gap 29. As may best be seen from FIG. 39, top attachment mechanisms 10top can clip the upper edge of the intermediate screen body 9mid to the upper edges of the end screen bodies 9 to connect the screen bodies together.

Kits for embodiments of the apparatus of FIGS. 37-39 can include the stands 27, top attachment mechanisms 10top, intermediate screen bodies 9mid and end screen bodies 9endfi. The stands 27 and top attachment mechanism 10top can be configured to have an interference fit connection with the top and bottom edges of the screen bodies so that no mechanical tool is needed for assembly of the privacy screen and/or biohazard screen apparatus 3. The intermediate screen body 9mid can be a body having a pre-selected length to permit the formed apparatus to provide a biohazard screen for a large number of different table dimensions as the opposite distal ends of the intermediate screen body 9mid can be positioned at different locations along the end screen bodies 9 for covering the gap 29. Shorter gaps 29 may result in more of the intermediate screen body 9mid being positioned along portions of the end screen bodies while larger gaps 29 may result in less of the intermediate screen body being positioned along the end screen bodies 9 in an overlapping positional arrangement. If gaps between the intermediate screen body 9mid and the end screen bodies 9 are desired, flexible strips 13fs can be positioned to seal such gaps while also facilitating further connection between the end screen bodies 9end or 9endfi and 9mid similar to the use of such flexible strips discussed elsewhere herein.

Similar to other embodiments discussed herein, some embodiments of a kit for the privacy screen and/or biohazard screen apparatus 3 shown in FIGS. 37-39 can be provided so only one kit or only a few kits for such embodiments may be needed to provide biohazard protection for a large number of possible work surface configurations. For instance, a single kit can be configured so that the kit can be used to install a privacy screen and/or biohazard screen apparatus 3 for the work surface dimensions in which a depth is 30 inches (76.2 cm) and a length (or width) of 90-48 inches (228.6 cm-121.92 cm) and also for work surfaces having a depth of 24 inches (60.96 cm) and a length (or width) of 40-104 inches (101.6 cm-264.16). For example, a single kit can provide at least one privacy screen and/or biohazard screen apparatus 3 for a work surface having any of the following dimensions (length by depth, with "inches" being referred to as """): 48"×30", 63"×30", 90"×30", 60"×24", 75"×24", and 104"×24".

In some embodiments of the kit, each end screen body 9 can have a fixed bend (e.g. a fixed "L" type configuration for enclosing a corner area adjacent an end of a work surface 2 in which a first portion 9a can extend at curved, rounded angle relative to a second portion (e.g. an angle of 90° or 80°-100°, etc.). Such a screen body 9 can be stacked within a box with other L-shaped screen bodies in a nested manner on one or more linearly extending, flat intermediate screen bodies (e.g. on top of such intermediate screen bodies or at a side of such bodies, etc.). Such L-shaped end screen bodies 9end can be configured so that a shorter portion 9a can extend along a 24" depth of an end of a work surface while the longer portion 9b extends along the length of a side of the work surface extending between the opposite ends of the work surface 2. This same end screen body can also be positioned so that its longer portion 9b can extend along a 30" depth at an end of a work surface while the shorter portion 9a extends along a portion of the length of the work surface at a side of the work surface that extends between the opposite ends of the work surface. The intermediate body 9mid included in the kit can then be positioned between opposite sides of the end screen bodies along a portion of the length of a peripheral edge for work surfaces longer than 48" (that have a 30" depth) or longer than 60" (for work surfaces having a 24" depth).

Other kits having L-shaped end screen bodies can be configured for other types of width and length work surface combinations as well. For instance, L-shaped end screen bodies can be configured so that a shorter portion can extend along an end of a work surface having a 23" depth while the longer portion extends along a portion of an edge of the work surface along the length of the work surface at a side of the work surface extending between the ends of the work surface. This same end screen body can also be positioned so that its longer portion can extend along a 29" depth at an end of a work surface while the shorter portion extends along a portion of the length of the work surface at a side of the work surface extending between the opposite ends of the work surface. The intermediate body 9mid can then be positioned between opposite sides of the end screen bodies 9end along a portion of the length of a peripheral edge for work surfaces longer than 48" (that have a 30" depth) or longer than 60" (for work surfaces having a 24" depth).

As discussed herein, embodiments of the kit for a privacy screen and/or biohazard screen apparatus 3 can help facilitate a quick deployment of privacy screens. The privacy screen bodies of the apparatus can also function as bioscreens that can protect workers in work areas form COVID-19 or other germs or viruses that may be spread by unintentionally spread by coworkers. The ease of manufacture, organization, shipment and ability of a quick deployment of the privacy screen bodies 9 for assembly and positioning on or adjacent a work surface can help improve worker safety and permit an employer to quickly deploy a large number of privacy screen and/or biohazard screen apparatuses in a short period of time while also addressing the different sizes and numbers of work surfaces 2 that may need such apparatuses. By use of a screen body of cardboard, corrugated plastic, acrylic, or other lightweight material, the shipment of such components can occur quickly, easily, and at lower cost to allow for prompt shipment, delivery, and subsequent assembly. Embodiments of the apparatus can also be configured to make assembly relatively easy without requiring use of many (or any) mechanical tools (e.g. wrenches, screwdrivers, etc.) by use of adhesive material and/or Velcro type material.

It should be understood that other modifications to the privacy screen and/or biohazard screen apparatuses and screen attachment apparatuses can be made to meet a particular set of design criteria. For example, it is contemplated that a particular feature described, either individually or as part of an embodiment, can be combined with other individually described features, or parts of other embodiments. The elements and acts of the various embodiments described herein can therefore be combined to provide further embodiments. As another example, the size, shape and weight of a screen body 3 can be any size or shape to meet a particular set of design criteria. As yet another example, use of a covering and/or the extent to which a covering may cover an exterior surface of a screen body 4 can be adjusted as needed to meet particular design criteria and/or to provide a desired aesthetic effect (e.g. colored film to cover a foam body, no use of a covering, use of a leather covering, use of decorative paint, film, or other arrangement on a cardboard privacy screen body to provide a desired aesthetic effect, etc.). As yet another example, the type of mounting connector that is utilized in an embodiment of the privacy screen and/or biohazard screen apparatus or screen attachment apparatus may be any type of connector structure geometry that may facilitate use of a pre-selected fastening mechanism to meet a particular set of design criteria.

Therefore, while certain exemplary embodiments of privacy screen and/or biohazard screen apparatuses, connection mechanisms for privacy screen and/or biohazard screen apparatuses (e.g. screen attachment apparatuses), and methods of making and using the same have been discussed and illustrated herein, it is to be distinctly understood that the invention is not limited thereto but may be otherwise variously embodied and practiced within the scope of the following claims.

What is claimed is:

1. A privacy screen and/or biohazard screen apparatus comprising:
   a first screen body,
   an attachment mechanism to position the first screen body adjacent a perimeter edge of a work surface so that the first screen body extends above the work surface;
   the attachment mechanism comprising a rail body having an "F" shaped profile defined by a first member extending from the rail body that is spaced apart from a second member extending from the rail body to define a gap between the first member and the second member, the first screen body positioned within the gap; and
   a second screen body positioned to abut the second member and also contact the rail body for being positioned next to the first screen body for forming a corner that is covered by the rail body;
   wherein the rail body having the "F" shaped profile extends from the first member to a position away from the second member; and
   wherein the rail body is configured for attachment to a bottom of the work surface.

2. The privacy screen and/or biohazard screen apparatus of claim 1, wherein the first screen body is comprised of cardboard, a clear polymeric material, an acrylic sheet, a glycol modified version of polyethylene terephthalate (PETG) sheet, a polypropylene sheet, or a corrugated polypropylene sheet.

3. The privacy screen and/or biohazard screen apparatus of claim 1, wherein the first screen body is attachable to the perimeter edge of the work surface.

4. The privacy screen and/or biohazard screen apparatus of claim 3, wherein the second screen body is attachable to the perimeter edge of the work surface.

5. The privacy screen and/or biohazard screen apparatus of claim 1, wherein the second screen body is attachable to the perimeter edge of the work surface.

6. The privacy screen and/or biohazard screen apparatus of claim 1, wherein the work surface is a tabletop.

7. The privacy screen and/or biohazard screen apparatus of claim 1, wherein the work surface is a desktop.

8. The privacy screen and/or biohazard screen apparatus of claim 1, wherein the work surface is a countertop.

* * * * *